US011381826B2

(12) United States Patent
Tanizawa et al.

(10) Patent No.: US 11,381,826 B2
(45) Date of Patent: *Jul. 5, 2022

(54) ENCODING DEVICE, DECODING DEVICE, ENCODING METHOD, AND DECODING METHOD

(71) Applicant: KABUSHIKI KAISHA TOSHIBA, Minato-ku (JP)

(72) Inventors: Akiyuki Tanizawa, Kanagawa (JP); Takeshi Chujoh, Kanagawa (JP); Taichiro Shiodera, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 252 days.

This patent is subject to a terminal disclaimer.

(21) Appl. No.: 16/857,846

(22) Filed: Apr. 24, 2020

(65) Prior Publication Data

US 2020/0252624 A1 Aug. 6, 2020

Related U.S. Application Data

(63) Continuation of application No. 16/521,145, filed on Jul. 24, 2019, now Pat. No. 10,674,161, which is a
(Continued)

(51) Int. Cl.
*G06K 9/36* (2006.01)
*H04N 19/159* (2014.01)
(Continued)

(52) U.S. Cl.
CPC ......... *H04N 19/159* (2014.11); *H04N 19/105* (2014.11); *H04N 19/126* (2014.11);
(Continued)

(58) Field of Classification Search
CPC ........... H04N 7/26868; H04N 7/26579; H04N 7/26393; H04N 7/2651; H04N 7/50;
(Continued)

(56) References Cited

U.S. PATENT DOCUMENTS

| 6,002,802 | A | 12/1999 | Chujoh et al. |
| 7,242,716 | B2 | 7/2007 | Koto et al. |

(Continued)

FOREIGN PATENT DOCUMENTS

| AU | 2011379258 B2 | 4/2013 |
| CN | 1668112 A | 9/2005 |

(Continued)

OTHER PUBLICATIONS

International Search Report dated Jan. 17, 2012 for PCT/JP2011/073851 filed Oct. 17, 2011 with English Translation.
(Continued)

*Primary Examiner* — Duy M Dang
(74) *Attorney, Agent, or Firm* — Oblon, McClelland, Maier & Neustadt, L.L.P.

(57) ABSTRACT

According to an embodiment, an encoding device includes an index setting unit and an encoding unit. The index setting unit generates a common index in which reference indices of one or more reference images included in a first index and a second index are sorted in a combination so as not to include a same reference image in accordance with a predetermined scanning order. The first index representing a combination of the one or more reference images referred to by a first reference image. The second index representing a combination of the one or more reference images referred to by a second reference image. The encoding unit encodes the common index.

2 Claims, 34 Drawing Sheets

Related U.S. Application Data continuation of application No. 16/113,330, filed on Aug. 27, 2018, now Pat. No. 10,412,394, which is a continuation of application No. 15/679,520, filed on Aug. 17, 2017, now Pat. No. 10,110,904, which is a continuation of application No. 15/590,876, filed on May 9, 2017, now Pat. No. 9,872,027, which is a continuation of application No. 14/799,253, filed on Jul. 14, 2015, now Pat. No. 9,681,138, which is a continuation of application No. 14/028,024, filed on Sep. 16, 2013, now abandoned, which is a continuation of application No. PCT/JP2011/073851, filed on Oct. 17, 2011.

(51) Int. Cl.
| | |
|---|---|
| H04N 19/126 | (2014.01) |
| H04N 19/186 | (2014.01) |
| H04N 19/94 | (2014.01) |
| H04N 19/105 | (2014.01) |
| H04N 19/176 | (2014.01) |
| H04N 19/70 | (2014.01) |
| H04N 19/172 | (2014.01) |
| H04N 19/136 | (2014.01) |
| H04N 19/463 | (2014.01) |

(52) U.S. Cl.
CPC ......... *H04N 19/136* (2014.11); *H04N 19/172* (2014.11); *H04N 19/176* (2014.11); *H04N 19/186* (2014.11); *H04N 19/463* (2014.11); *H04N 19/70* (2014.11); *H04N 19/94* (2014.11)

(58) Field of Classification Search
CPC .. H04N 7/30; H04N 7/26244; H04N 7/26313; H04N 7/26079; G06T 9/007; G06K 9/645; G06K 9/6202; G06K 9/03; G06K 9/20; G06K 9/32
See application file for complete search history.

(56) References Cited

U.S. PATENT DOCUMENTS

| | | | |
|---|---|---|---|
| 7,450,643 B2 | 11/2008 | Chujoh et al. | |
| 9,872,027 B2* | 1/2018 | Tanizawa | H04N 19/186 |
| 10,110,904 B2 | 10/2018 | Tanizawa | |
| 10,187,642 B2* | 1/2019 | Tanizawa | H04N 19/126 |
| 10,412,394 B2 | 9/2019 | Tanizawa | |
| 2003/0215014 A1 | 11/2003 | Koto et al. | |
| 2004/0258156 A1 | 12/2004 | Chujoh et al. | |
| 2005/0243931 A1 | 11/2005 | Yasuda et al. | |
| 2006/0083308 A1 | 4/2006 | Schwarz et al. | |
| 2008/0240236 A1 | 10/2008 | Uchida et al. | |
| 2009/0010330 A1 | 1/2009 | Tourapis et al. | |
| 2009/0147857 A1 | 6/2009 | Park et al. | |
| 2009/0262806 A1 | 10/2009 | Chujoh et al. | |
| 2014/0072237 A1 | 3/2014 | Tanizawa et al. | |
| 2018/0367803 A1 | 12/2018 | Tanizawa | |

FOREIGN PATENT DOCUMENTS

| | | | |
|---|---|---|---|
| CN | 101204094 A | 6/2008 | |
| CN | 101283600 A | 10/2008 | |
| CN | 102098514 A | 6/2011 | |
| JP | 2004-007377 | 1/2004 | |
| JP | 2004-7379 A | 1/2004 | |
| JP | 2004-242276 A | 8/2004 | |
| JP | 2008-252818 A | 10/2006 | |
| JP | 2007-221201 | 8/2007 | |
| JP | 2009-525687 | 7/2009 | |
| JP | 6105034 B2 | 3/2017 | |
| KR | 10-2005-0028026 | 3/2005 | |
| TW | 201134225 A1 | 10/2011 | |
| WO | WO 2013/012792 A1 | 1/2013 | |
| WO | WO 2013/057782 A1 | 4/2013 | |

OTHER PUBLICATIONS

Office Action dated Jul. 14, 2016 in Mexican Patent Application No. MX/a/2016/001118 with English language translation.
Office Action dated Mar. 21, 2016 in European Patent Application No. 11 874 125.5.
Office Action dated Apr. 5, 2016 in Australian Patent Application No. 2015213330.
Office Action dated Jun. 9, 2016 in Korean Patent Application No. 10-2016-7012309 (with English language translation).
Combined Office Action and Search Report dated Jun. 14, 2016 in Chinese Patent Application No. 201180073124.7 (with English language translation).
Thomas Wiegand, et al., "WD2: Working Draft 2 of High-Efficiency Video Coding" Joint Collaborative Team on Video Coding (JCT-VC) of ITU-T SG16 WP3 and ISO/IEC JTC1/SC29/WG11, Document: JCTVC-D503, Jan. 20-28, 2011, 155 Pages.
International Written Opinion dated Jan. 17, 2012 for PCT/JP2011/073851 filed Oct. 17, 2011.
Joonyoung Park et al., "Redundancy of Bi-directional Inter Prediction in Generalized P and B picture", Joint Collaborative Team on Video Coding (JCT-VC) of ITU-T SG16 WP3 and ISO/IEC JTC1/SC29/WG11, Doc: JCTVC-D089r1, $4^{th}$ Meeting, Daegu—KR, Jan. 2011.
Philippe Bordes,"Weighted Prediction", Joint Collaborative Team on Video Coding (JCT-VC) of ITU-T SG16 WP3 and ISO/IEC JTC1/SC29/WG11, Doc: JCTVC-F265, $6^{th}$ Meeting, Torino—IT, Jul. 2011.
Yoshinori Suzuki, "Extension of uni-prediction simplification in B slices", Joint Collaborative Team on Video Coding (JCT-VC) of ITU-T SG16 WP3 and ISO/IEC JTC1/SC29/WG11, Doc: JCTVC-D421, $4^{th}$ Meeting, Daegu—KR, Jan. 2011.
Office Action dated Mar. 11, 2014, in Japanese Patent Application No. 2013-539429 with English translation.
Patent Examination Report dated Dec. 8, 2014 in Australian Patent Application No. 2011379258.
Office Action dated Jul. 30, 2014 in Vietnamese Patent Application No. 1-2014-01556 (with English translation).
Office Action dated Mar. 3, 2015 in Japanese Patent Application No. 2014-098965 (with English language translation).
Combined Office Action and Search Report dated Mar. 2, 2015 in Taiwanese Patent Application No. 101101750 (with English language translation).
Extended European Search Report dated May 4, 2015 in Patent Application No. 11874125.5.
Office Action dated May 22, 2015 in Korean Patent Application No. 10-2014-7005322 (submitting English translation only).
Office Action dated Jun. 9, 2015 in Canadian Patent Application No. 2,847,296.
Athanasios Leontaris, et al., "Weighted prediction methods for improved motion compensation" $16^{th}$ IEEE International Conference on Image Processing, XP31628457A, Nov. 7, 2009, pp. 1029-1032.
Korean Office Action dated Aug. 17, 2015 in Patent Application No. 10-2015-7019999 (with English Translation).
Office Action dated Jul. 28, 2015 in Japanese Patent Application No. 2014-098965 (with English language translation).
Office Action dated Aug. 26, 2015 in Mexican Patent Application No. MX/a/2015/005669 (with partial English language translation).
Combined Office Action and Search Report dated Aug. 24, 2016 in Taiwanese Patent Application No. 104142717 with English translation.
Office Action dated Sep. 6, 2016 in Japanese Patent Application No. 2015-246525 (with an English machine translation from Data source: JPO Global Dossier, Translated: Sep. 12, 2016, Dictionary last updated Jul. 24, 2016).
Stephan Wenger, et al., "Adaption Parameter Set (APS)" JCTVC-F747r3, Joint Collaborative Team on Video Coding (JCT-VC) of

(56) References Cited

OTHER PUBLICATIONS

ITU-T SG16 WP3 and ISO/IEC JTC1/SC29/WG11, $6^{th}$ Meeting, Torino, IT, Jul. 14-22, 2011, p. 1-10.

Benjamin Bross, et al., "WD4: Working Draft 4 of High-Efficiency Video Coding" Joint Collaborative Team on Video coding (JCT-VC), of ITU-T SG16 WP3 and ISO/IEC JTC1/SC29/WG11, $6^{th}$ Meeting, Document: JCTVC-F803_d2, Jul. 14-22, 2011, pp. 28-30 with cover page.

Thomas Wiegand, et al., WD1: Working Draft 1 of High-Efficiency Video Coding. Joint Collaborative Team on Video Coding (JCT-VC) of ITU-T SG16 WP3 and ISO/IEC JTC1/SC29/WG11, $3^{rd}$ Meeting: Guangzhou, CN, 2010, JCTVC-C403, 5 pages.

Hannuksela, "Issues on High-Level Syntax and Semantics Appendix: Changes Relative to JVT-E022d7", Joint Video Team (JVT) of ISO/IEC MPEG and ITU-T VCEG, 5th Meeting: JVT-E124Appendix, XP030005538, Oct. 2002, 28 pages.

Bordes, P. "Weighted Prediction", Technicolor, Joint Collaborative Team on Video Coding (JCT-VC) of ITU-T SG16 WP3 and ISO/IEC JTC1/SC29/WG11 5th Meeting, JCTVC-E041r2 WG11 No. m19545, XP030058112, 2011, 9 pages.

\* cited by examiner

FIG.9A

| LIST NUMBER | 0 | | | | | | |
|---|---|---|---|---|---|---|---|
| REFERENCE NUMBER | 0 | 1 | 2 | 3 | 4 | ... | N |
| WP APPLICATION FLAG | WP_flag[0] | WP_flag[1] | WP_flag[2] | WP_flag[3] | WP_flag[4] | ... | WP_flag[N] |
| WEIGHTING FACTOR | Weight[0] | Weight[1] | Weight[2] | Weight[3] | Weight[4] | ... | Weight[N] |
| OFFSET | Offset[0] | Offset[1] | Offset[2] | Offset[3] | Offset[4] | ... | Offset[N] |

FIG.9B

| LIST NUMBER | 1 | | | | | | |
|---|---|---|---|---|---|---|---|
| REFERENCE NUMBER | 0 | 1 | 2 | 3 | 4 | ... | N |
| WP APPLICATION FLAG | WP_flag[0] | WP_flag[1] | WP_flag[2] | WP_flag[3] | WP_flag[4] | ... | WP_flag[N] |
| WEIGHTING FACTOR | Weight[0] | Weight[1] | Weight[2] | Weight[3] | Weight[4] | ... | Weight[N] |
| OFFSET | Offset[0] | Offset[1] | Offset[2] | Offset[3] | Offset[4] | ... | Offset[N] |

FIG.14

| SCANNING ORDER | REFERENCE NUMBER (refIdx) | | | | | |
|---|---|---|---|---|---|---|
| | 0 | 1 | 2 | 3 | ... | N |
| LIST 0 | 0 | 2 | 4 | 6 | | 2N |
| LIST 1 | 1 | 3 | 5 | 7 | | 2N+1 |

FIG.15

| | REFERENCE NUMBER (refIdx) | | | |
|---|---|---|---|---|
| | 0 | 1 | 2 | 3 |
| COMMON LIST | 3 | 2 | 1 | 0 |

FIG.16

|  | REFERENCE NUMBER (refIdx) | | | |
| --- | --- | --- | --- | --- |
|  | 0 | 1 | 2 | 3 |
| COMMON LIST | 0 | 2 | 4 | 8 |

FIG.19

| pic_parameter_set_rbsp( ) { | Descriptor |
|---|---|
|    pic_parameter_set_id | u(8) |
|    seq_parameter_set_id | u(8) |
|    ... | |
|    num_ref_idx_l0_default_active_minus1 | ue(v) |
|    num_ref_idx_l1_default_active_minus1 | ue(v) |
|    weighted_pred_flag | u(1) |
|    weighted_bipred_idc | u(2) |
|    ... | |
|    rbsp_trailing_bits( ) | |
| } | |

FIG.20

| slice_header( ) { | Descriptor |
|---|---|
|    ... | |
|    slice_type | ue(v) |
|    pic_parameter_set_id | ue(v) |
|    ... | |
|    if( slice_type = = P \|\| slice_type = = B ) { | |
|      num_ref_idx_active_override_flag | u(1) |
|      if( num_ref_idx_active_override_flag ) { | |
|        num_ref_idx_l0_active_minus1 | ue(v) |
|        if( slice_type = = B ) | |
|          num_ref_idx_l1_active_minus1 | ue(v) |
|      } | |
|    } | |
|    ... | |
|    if( ( weighted_pred_flag && ( slice_type = = P ) ) \|\|<br>     ( weighted_bipred_idc = = 1 && slice_type = = B ) ) | |
|      pred_weight_table( ) | |
|    ... | |
| } | |

FIG.21

| pred_weight_table( ) { | Descriptor |
|---|---|
|   luma_log2_weight_denom | ue(v) |
|   if( chroma_format_idc != MONO_IDX ) | |
|     chroma_log2_weight_denom | ue(v) |
|   for( i = 0; i <= num_ref_common_active_minus1; i++ ) { | |
|     luma_weight_common_flag | u(1) |
|     if( luma_weight_common_flag ) { | |
|       luma_weight_common[ i ] | se(v) |
|       luma_offset_common[ i ] | se(v) |
|     } | |
|     if ( chroma_format_idc != MONO_IDX ) { | |
|       chroma_weight_common_flag | u(1) |
|       if( chroma_weight_common_flag ) | |
|         for( j =0; j < COLOR_COMP − 1;j++) { | |
|           chroma_weight_common[ i ][ j ] | se(v) |
|           chroma_offset_common[ i ][ j ] | se(v) |
|         } | |
|     } | |
|   } | |

FIG.22

| seq_parameter_set_rbsp( ) { | Descriptor |
|---|---|
|   profile_idc | u(8) |
|   reserved_zero_8bits /* equal to 0 */ | u(8) |
|   level_idc | u(8) |
|   seq_parameter_set_id | ue(v) |
|   ... | |
|   num_ref_frames | ue(v) |
|   ... | |
|   weighted_prediction_enabled_flag | u(1) |
|   ... | |
|   rbsp_trailing_bits( ) | |
| } | |

FIG.23

| aps_rbsp( ) { | Descriptor |
|---|---|
|    aps_id | ue(v) |
|    ... | |
|    aps_weighted_prediction_flag | u(1) |
|    aps_weighted_bipred_idx | u(2) |
|    ... | |
|    if( aps_weighted_prediction_flag \|\| aps_weighted_bipred_idx = = 1 ) | |
|       pred_weight_table( ) | |
|    ... | |
|    rbsp_trailing_bits( ) | |
| } | |

FIG.24

| pred_weight_table( ) { | Descriptor |
|---|---|
|    luma_log2_weight_denom | ue(v) |
|    if( chroma_format_idc != MONO_IDX ) | |
|       chroma_log2_weight_denom | ue(v) |
|    for( i = 0; i <= MAX_COMMON_REF_MINUS1; i++ ) { | |
|       luma_weight_common_flag | u(1) |
|       if( luma_weight_common_flag ) { | |
|          luma_weight_common[ i ] | se(v) |
|          luma_offset_common[ i ] | se(v) |
|       } | |
|       if ( chroma_format_idc != MONO_IDX ) { | |
|          chroma_weight_common_flag | u(1) |
|          if( chroma_weight_common_flag ) | |
|             for( j =0; j < COLOR_COMP - 1; j++ ) { | |
|             chroma_weight_common[ i ][ j ] | se(v) |
|             chroma_offset_common[ i ][ j ] | se(v) |
|          } | |
|       } | |
|    } | |

FIG.27

| pred_weight_table( ) { | Descriptor |
|---|---|
|   luma_log2_weight_denom | ue(v) |
|   if( chroma_format_idc != MONO_IDX) | |
|     chroma_log2_weight_denom | ue(v) |
|   for( i = 0; i <= num_ref_idx_l0_active_minus1; i++ ) { | |
|     luma_weight_l0_flag | u(1) |
|     if( luma_weight_l0_flag ) { | |
|       luma_weight_l0[ i ] | se(v) |
|       luma_offset_l0[ i ] | se(v) |
|     } | |
|     if ( chroma_format_idc != MONO_IDX) { | |
|       chroma_weight_l0_flag | u(1) |
|       if( chroma_weight_l0_flag ) | |
|         for( j =0; j < COLOR_COMP - 1; j++ ) { | |
|           chroma_weight_l0[ i ][ j ] | se(v) |
|           chroma_ offset_l0[ i ][ j ] | se(v) |
|         } | |
|     } | |
|   } | |
|   if( slice_type = = B_SLICE ) | |
|     for( i = 0; i <= num_ref_idx_l1_active_minus1; i++ ) { | |
|       reuse_wp_flag | u(1) |
|       if(reuse_wp_flag) { | |
|         reuse_ref_idx | se(v) |
|       } else { | |
|         luma_weight_l1_flag | u(1) |
|         if( luma_weight_l1_flag ) { | |
|           luma_weight_l1[ i ] | se(v) |
|           luma_offset_l1[ i ] | se(v) |
|         } | |
|         if( chroma_format_idc != MONO_IDX ) { | |
|           chroma_weight_l1_flag | u(1) |
|           if( chroma_weight_l1_flag ) | |
|             for( j =0; j < COLOR_COMP - 1; j++ ) { | |
|               chroma_weight_l1[ i ][ j ] | se(v) |

FIG.31

| PIXEL BLOCK POSITION | Available? | PIXEL BLOCK POSITION INDEX (idx) |
|---|---|---|
| A | YES | 0 |
| B | YES | 1 |
| C | NO | - |
| D | YES | 2 |
| E | YES | 3 |
| T | YES | 4 |

FIG.33

| idx | MergeCandList [idx] | |
| --- | --- | --- |
| | REFERENCE LIST 0 | REFERENCE LIST 1 |
| 0 | refIdx0, mv0 | -- |
| 1 | -- | refIdx1, mv1 |
| 2 | refIdx2, mv2 | -- |
| 3 | refIdx3, mv3 | refIdx3, mv3 |
| 4 | refIdx4, mv4 | refIdx4, mv4 |

FIG.35

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

FIG.36

| |
|---|
| prediction_unit( x0, y0 ) { |
|   if( skip_flag[ x0 ][ y0 ] ) { |
|     merge_idx[ x0 ][ y0 ] |
|   } else if( PredMode == MODE_INTRA ) { |
|     ... |
|   } else { /* MODE_INTER */ |
|     if( entropy_coding_mode_flag \|\| PartMode != PART_2Nx2N ) |
|       merge_flag[ x0 ][ y0 ] |
|     if( merge_flag[ x0 ][ y0 ] ) { |
|       merge_idx[ x0 ][ y0 ] |
|     } else { |
|       ... |
|     } |
|   } |
| } |

ENCODING DEVICE, DECODING DEVICE, ENCODING METHOD, AND DECODING METHOD

CROSS-REFERENCE TO RELATED APPLICATIONS

This application is a continuation application of U.S. application Ser. No. 16/521,145, filed Jul. 24, 2019, which is a continuation application of U.S. application Ser. No. 16/113,330, filed Aug. 27, 2018 (now U.S. Pat. No. 10,412,394), which is a continuation application of U.S. application Ser. No. 15/679,520, filed Aug. 17, 2017 (now U.S. Pat. No. 10,110,904), which is a continuation application of U.S. application Ser. No. 15/590,876, filed May 9, 2017 (now U.S. Pat. No. 9,872,027), which is a continuation of U.S. application Ser. No. 14/799,253 filed Jul. 14, 2015 (now U.S. Pat. No. 9,681,138), which is a continuation application of U.S. application Ser. No. 14/028,024 filed Sep. 16, 2013, which is a continuation of PCT international Application Ser. No. PCT/JP2011/073851, filed on Oct. 17, 2011, which designates the United States; the entire contents of each of which are incorporated herein by reference.

FIELD

Embodiments described herein relate generally to an encoding method and a decoding method.

BACKGROUND

In recent years, a method of encoding an image with markedly improved coding efficiency is recommended as ITU-T REC. H.264 and ISO/IEC 14496-10 (hereinafter, referred to as "H.264") in cooperation of ITU-T (International Telecommunication Union Telecommunication Standardization Sector) and ISO (International Organization for Standardization)/IEC (International Electrotechnical Commission).

In H.264, an inter-prediction coding system is disclosed in which redundancy in the time direction is eliminated to achieve high coding efficiency by making a motion compensation prediction of fractional precision using a coded image as a reference image.

In addition, a system is proposed in which a moving image including a fading or dissolving effect is encoded with efficiency higher than that of an inter-prediction coding system according to ISO/IEC MPEG (Moving Picture Experts Group)-1, 2, 4. In this system, a motion compensation prediction of fractional precision is made for an input moving image having luminance and two color differences as frames for predicting a change in the brightness in the time direction. Then, by using an index representing a combination of a reference image, a weighting factor for each luminance and two color differences, and an offset for each luminance and two color differences, a predicted image is multiplied by the weighting factor, and the offset is added thereto.

However, in the technology of the related art as described above, in a bidirectional prediction slice in which bi-directional predictions can be selected, when weighted motion compensation is performed using two indices having the same reference image but having different reference image numbers different from each other, there are cases where an index having the same value is encoded twice, and accordingly, there are cases where the coding efficiency decreases.

An object of the present invention is to provide an encoding method and a decoding method capable of improving the coding efficiency.

BRIEF DESCRIPTION OF THE DRAWINGS

FIG. 9A is a diagram that illustrates an example of WP parameter information according to the first embodiment;

FIG. 9B is a diagram that illustrates an example of WP parameter information according to the first embodiment;

FIG. 14 is a diagram that illustrates an example of the scanning order of a list number and a reference number of a reference image according to the first embodiment;

FIG. 15 is a diagram that illustrates an example of the WP parameter information after a common list conversion according to the first embodiment in a simplified manner;

FIG. 16 is diagram that illustrates an example of the WP parameter information after a common list conversion according to the first embodiment in a simplified manner;

FIG. 19 is a diagram that illustrates an example of picture parameter set syntax according to the first embodiment;

FIG. 20 is a diagram that illustrates slice header syntax according to the first embodiment;

FIG. 21 is a diagram that illustrates an example of pred weight table syntax according to the first embodiment.

FIG. 22 is a diagram that illustrates an example of sequence parameter set syntax according to a modification;

FIG. 23 is a diagram that illustrates an example of adaptation parameter set syntax according to a modification;

FIG. 24 is a diagram that illustrates an example of a pred weight table syntax according to a modification;

FIG. 27 is a diagram that illustrates an example of pred weight table syntax according to the second embodiment;

FIG. 31 is a diagram that illustrates an example of the relation between pixel block positions of a plurality of motion information candidates and pixel block position indices according to the third embodiment;

FIG. 33 is a diagram that illustrates an example of a storage list of motion information according to the third embodiment;

FIG. 35 is a diagram that illustrates an example of a combination of a bidirectional prediction according to the third embodiment;

FIG. 36 is a diagram that illustrates an example of pred unit syntax according to the third embodiment;

DETAILED DESCRIPTION

According to an embodiment, an encoding device includes an index setting unit and an encoding unit. The index setting unit generates a common index in which reference indices of one or more reference images included in a first index and a second index are sorted in a combination so as not to include a same reference image in accordance with a predetermined scanning order. The first index representing a combination of the one or more reference images referred to by a first reference image. The second index representing a combination of the one or more reference images referred to by a second reference image. The encoding unit encodes the common index.

Hereinafter, embodiments will be described in detail with reference to the accompanying drawings. An encoding device and a decoding device according to each embodiment presented below may be implemented by hardware such as an LSI (Large-Scale Integration) chip, a DSP (Digital Signal Processor), or an FPGA (Field Programmable Gate Array). In addition, an encoding device and a decoding device according to each embodiment presented below may be implemented by causing a computer to execute a program, in other words, by software. In description presented below, a term "image" may be appropriately replaced by a term such as a "video", a "pixel", an "image signal", a "picture", or "image data".

First Embodiment

In a first embodiment, an encoding device encoding a moving image will be described.

Figure 1:
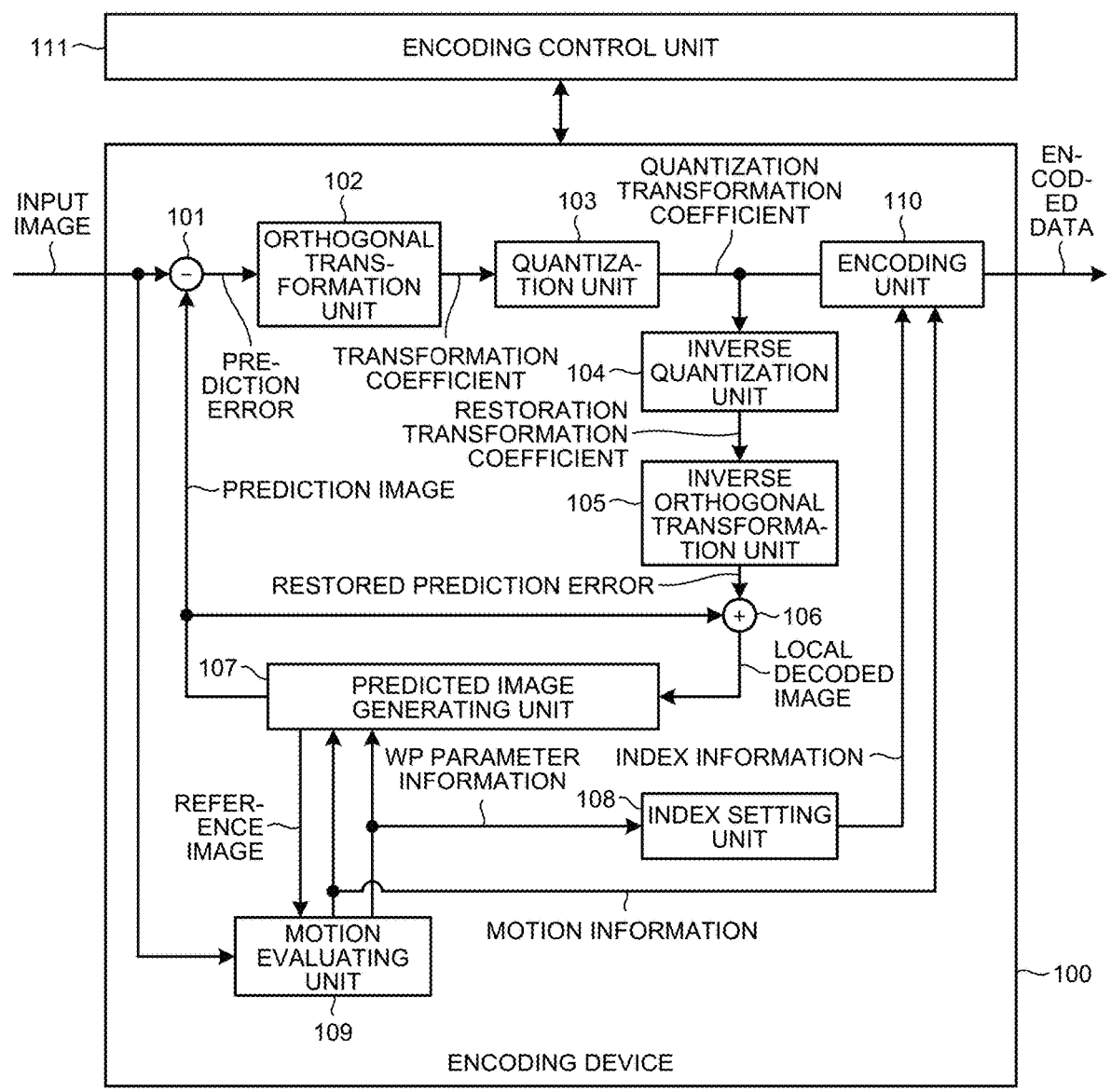
FIG. 1 is a block diagram that illustrates an example of an encoding device according to a first embodiment.

FIG. 1 is a block diagram that illustrates an example of the configuration of an encoding device 100 according to a first embodiment.

The encoding device 100 divides each frame or each field configuring an input image into a plurality of pixel blocks and performs predicted encoding of the divided pixel blocks using encoding parameters input from an encoding control unit 111, thereby generating a predicted image. Then, the encoding device 100 generates a prediction error by subtracting the predicted image from the input image divided into the plurality of pixel blocks, generates encoded data by performing orthogonal transformation, and quantization, and then entropy encoding for the generated prediction error, and outputs the generated encoded data.

The encoding device 100 performs predicted encoding by selectively applying a plurality of prediction modes that are different from each other in at least one of the block size of the pixel block and the method of generating a predicted image. The method of generating a predicted image can be largely divided into two types including an intra-prediction in which a prediction is made within an encoding target frame and an inter-prediction in which a motion-compensated prediction is made using one or more reference frames of different time points. The intra-prediction is also called an internal-screen prediction, an internal-frame prediction, or the like, and the inter-prediction is also called an inter-screen prediction, an inter-frame prediction, a motion-compensated prediction, or the like.

Figure 2:
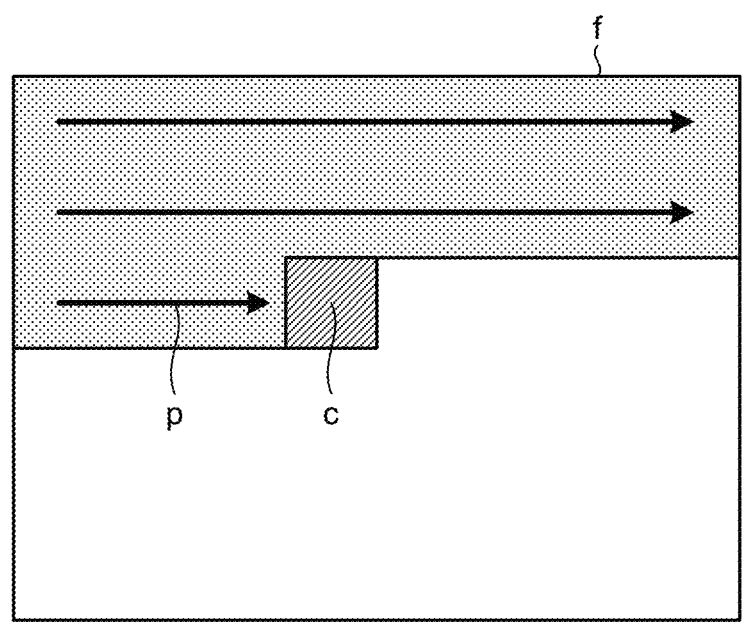
FIG. 2 is an explanatory diagram that illustrates an example of a predicted coding sequence for a pixel block according to the first embodiment.

FIG. 2 is an explanatory diagram that illustrates an example of a predicted coding sequence for a pixel block according to the first embodiment. In the example illustrated in FIG. 2, the encoding device 100 performs prediction encoding from the upper left side toward the lower right side in the pixel block. Thus, in an encoding processing target frame f, on the left side and the upper side of the encoding target pixel block c, pixel blocks p that have been completed to be encoded are located. Hereinafter, for the simplification of description, while it is assumed that the encoding device 100 performs prediction encoding in order illustrated in FIG. 2, the order in the predicted encoding is not limited thereto.

The pixel block represents a unit for processing an image and, for example, a block having an M×N size (here, M and N are natural numbers), a coding tree block, a macro block, a sub-block, one pixel, or the like corresponds thereto. In description presented below, basically, the pixel block is used as the meaning of a coding tree block but may be used as a different meaning. For example, in description of a prediction unit, a pixel block is used as the meaning of a pixel block of the prediction unit. A block may be referred to as a unit or the like. For example, a coding block may be referred to as a coding unit.

Figure 3A:
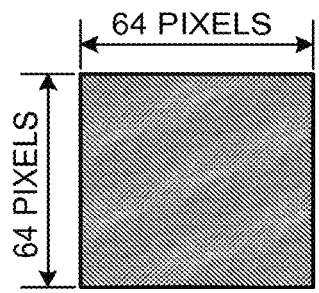
FIG. 3A is a diagram that illustrates an example of the size of a coding tree block according to the first embodiment.

FIG. 3A is a diagram that illustrates an example of the size of a coding tree block according to the first embodiment. The coding tree block, typically, is a pixel block of 64×64 as illustrated in FIG. 3A. However, the coding tree block is not limited thereto but may be a pixel block of 32×32, a pixel block of 16×16, a pixel block of 8×8, a pixel block of 4×4, or the like. Here, the coding tree block may not be a square but, for example, may be a pixel block of an M×N size (here, M≠N).

Figure 3B:
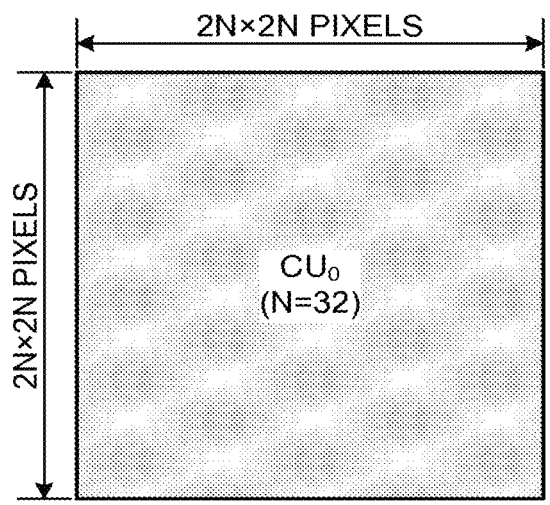
FIG. 3B is a diagram that illustrates a specific example of the coding tree block according to the first embodiment.
Figure 3C:
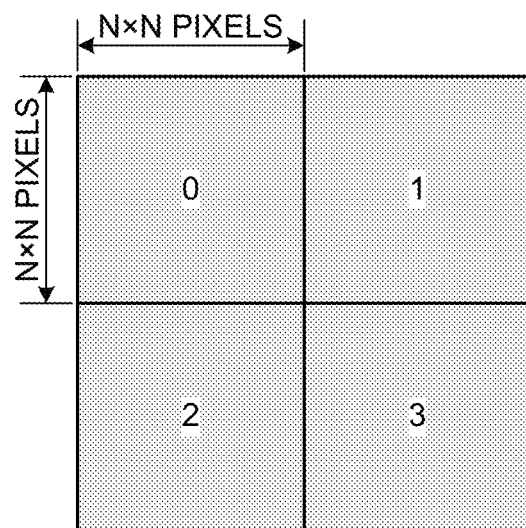
FIG. 3C is a diagram that illustrates another specific example of the coding tree block according to the first embodiment.
Figure 3D:
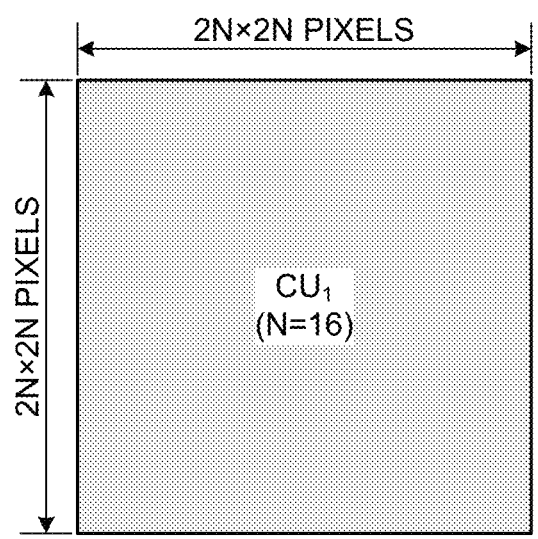
FIG. 3D is a diagram that illustrates another specific example of the coding tree block according to the first embodiment.

FIGS. 3B to 3D are diagrams representing specific examples of the coding tree block according to the first embodiment. FIG. 3B represents a coding tree block having a size of 64×64 (N=32). Here, N represents the size of a reference coding tree block. The size of a case where the coding tree block is divided is defined as N, and the size of a case where the coding tree block is not divided is defined as 2N. FIG. 3C represents a coding tree block acquired by dividing the coding tree block illustrated in FIG. 3B into a quadtree. The coding tree block, as illustrated in FIG. 3C, has a quadtree structure. In a case where the coding tree block is divided, as illustrated in FIG. 3C, numbers are attached to four pixel blocks after division in the Z scanning order.

In addition, within each number of the quadtree, the coding tree block may be further divided into a quadtree. Accordingly, the coding tree block may be divided in a hierarchical manner. In such a case, the depth of the division is defined as Depth. FIG. 3D represents one of the coding tree blocks acquired by dividing the coding tree block illustrated in FIG. 3B into a quadtree, and the block size thereof is 32×32 (N=16). The depth of the coding tree block illustrated in FIG. 3B is "0", and the depth of the coding tree block illustrated in FIG. 3D is "1". In addition, a coding tree block having a largest unit is called a large coding tree block, and an input image signal is encoded in such a unit in the raster scanning order.

In the description presented below, the encoded target block or the coding tree block of an input image may be referred to as a prediction target block or a prediction pixel block. In addition, the encoding unit is not limited to the pixel block, but at least one of a frame, a field, a slice, a line, and a pixel may be used as the encoding unit.

The encoding device 100, as illustrated in FIG. 1, includes: a subtraction unit 101; an orthogonal transformation unit 102; a quantization unit 103; an inverse quantization unit 104; an inverse orthogonal transformation unit 105; an addition unit 106; a predicted image generating unit 107; an index setting unit 108; a motion evaluating unit 109; and an encoding unit 110. In addition, the encoding control unit 111 illustrated in FIG. 1 controls the encoding device 100 and, for example, may be implemented by using a CPU (Central Processing Unit) or the like.

The subtraction unit 101 acquires a prediction error by subtracting a corresponding predicted image from an input image divided into pixel blocks. The subtraction unit 101 outputs the prediction error so as to be input to the orthogonal transformation unit 102.

The orthogonal transformation unit 102 performs an orthogonal transformation such as a discrete cosine transform (DCT) or a discrete sine transform (DST) for the prediction error input from the subtraction unit 101, thereby acquiring a transformation coefficient. The orthogonal transformation unit 102 outputs the transformation coefficient so as to be input to the quantization unit 103.

The quantization unit 103 performs a quantization process for the transformation coefficient input from the orthogonal transformation unit 102, thereby acquiring a quantization transformation coefficient. More specifically, the quantization unit 103 performs quantization based on a quantization parameter designated by the encoding control unit 111 and quantization information such as a quantization matrix. Described in more detail, the quantization unit 103 acquires the quantization transformation coefficient by dividing the transformation coefficient by a quantization step size derived based on the quantization information. The quantization parameter represents the fineness of the quantization. The quantization matrix is used for weighting the fineness of the quantization for each component of the transformation coefficient. The quantization unit 103 outputs the quantization transformation coefficient so as to be input to the inverse quantization unit 104 and the encoding unit 110.

The inverse quantization unit 104 performs an inverse quantization process for the quantization transformation coefficient input from the quantization unit 103, thereby acquiring a restoration transformation coefficient. More specifically, the inverse quantization unit 104 performs inverse quantization based on the quantization information used by the quantization unit 103. Described in detail, the inverse quantization unit 104 acquires a restoration transformation coefficient by multiplying the quantization transformation coefficient by the quantization step size derived based on the quantization information. In addition, the quantization information used by the quantization unit 103 is loaded from internal memory, which is not illustrated in the figure, of the encoding control unit 111 and is used. The inverse quantization unit 104 outputs the restoration transformation coefficient so as to be input to the inverse orthogonal transformation unit 105.

The inverse orthogonal transformation unit 105 performs an inverse orthogonal transformation such as an inverse discrete cosine transform (IDCT) or an inverse discrete sine transform (IDST) for the restoration transformation coefficient input from the inverse quantization unit 104, thereby acquiring a restoration prediction error. Here, the inverse orthogonal transformation performed by the inverse orthogonal transformation unit 105 corresponds to an orthogonal transformation performed by the orthogonal transformation unit 102. The inverse orthogonal transformation unit 105 outputs the restoration prediction error so as to be input to the addition unit 106.

The addition unit 106 adds the restoration prediction error input from the inverse orthogonal transformation unit 105 and a corresponding predicted image, thereby generating a local decoded image. The addition unit 106 outputs the local decoded image so as to be input to the predicted image generating unit 107.

The predicted image generating unit 107 stores the local decoded image input from the addition unit 106 in memory (not illustrated in FIG. 1) as a reference image and outputs the reference image stored in the memory so as to be input to the motion evaluating unit 109. In addition, the predicted image generating unit 107 generates a predicted image by performing a weighted motion-compensated prediction based on the motion information and WP parameter information input from the motion evaluating unit 109. The predicted image generating unit 107 outputs the predicted image so as to be input to the subtraction unit 101 and the addition unit 106.

Figure 4:
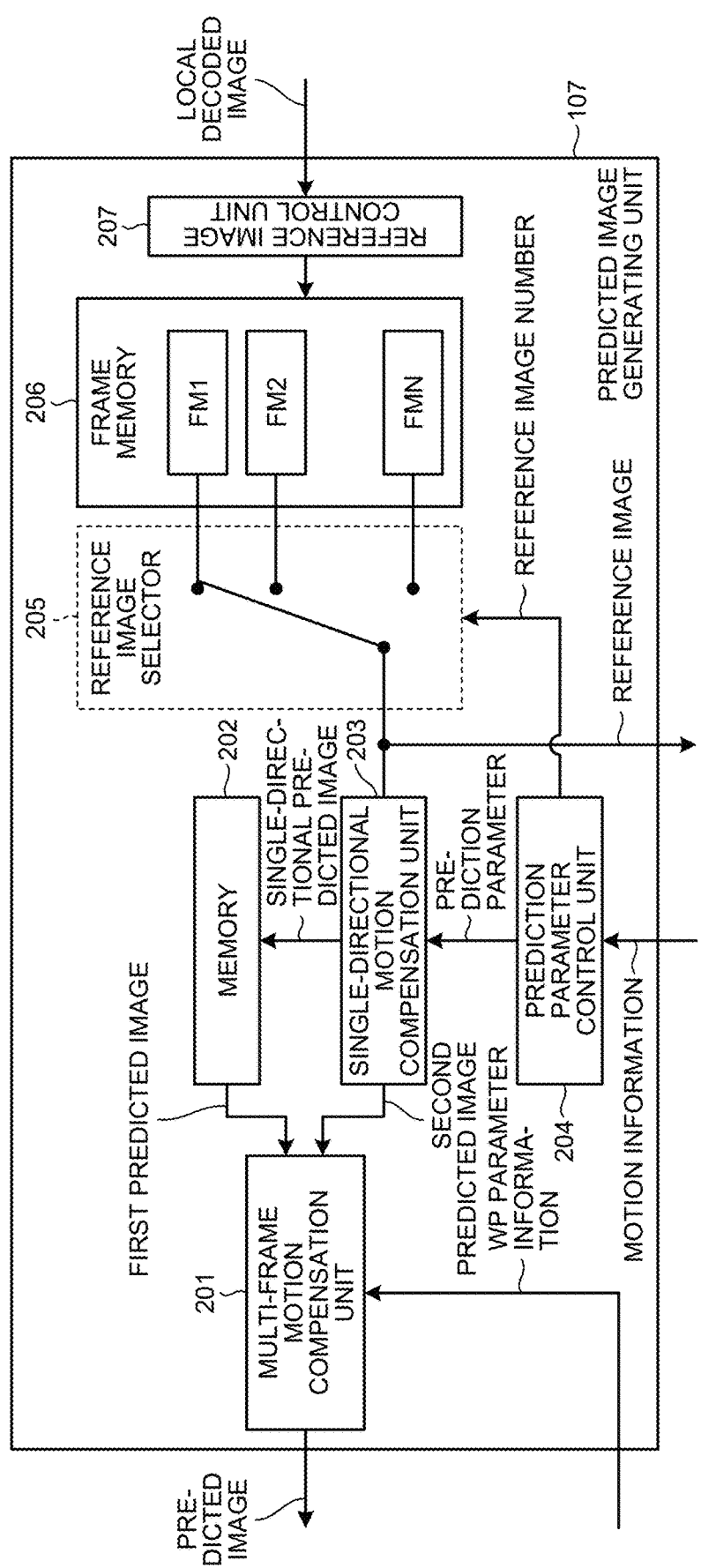
FIG. 4 is a block diagram that illustrates an example of a predicted image generating unit according to the first embodiment.

FIG. 4 is a block diagram that illustrates an example of the configuration of the predicted image generating unit 107 according to the first embodiment. The predicted image generating unit 107, as illustrated in FIG. 4, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the local decoded image input from the addition unit 106 as a reference image under the control of the reference image control unit 207. The frame memory 206 includes a plurality of memory sets FM1 to FMN (here, N≥2) used for temporarily storing the reference image.

The prediction parameter control unit 204 prepares a plurality of combinations a reference image number and a prediction parameter as a table based on the motion information input from the motion evaluating unit 109. Here, the motion information represents information of a motion vector representing the deviation of a motion that is used for the motion-compensated prediction, the reference image number, and a prediction mode such as a single-directional/bidirectional prediction. The prediction parameter represents information relating to the motion vector and the prediction mode. Then, the prediction parameter control unit 204 selects a combination of a reference number and a prediction parameter used for generating a predicted image based on the input image and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be switched to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output terminal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203 and the motion evaluating unit 109.

The single-directional predicted motion compensation unit 203 performs a motion-compensated prediction process based on the prediction parameter input from the prediction parameter control unit 204 and the reference image input from the reference image selector 205, thereby generating a single-directional predicted image.

Figure 5:
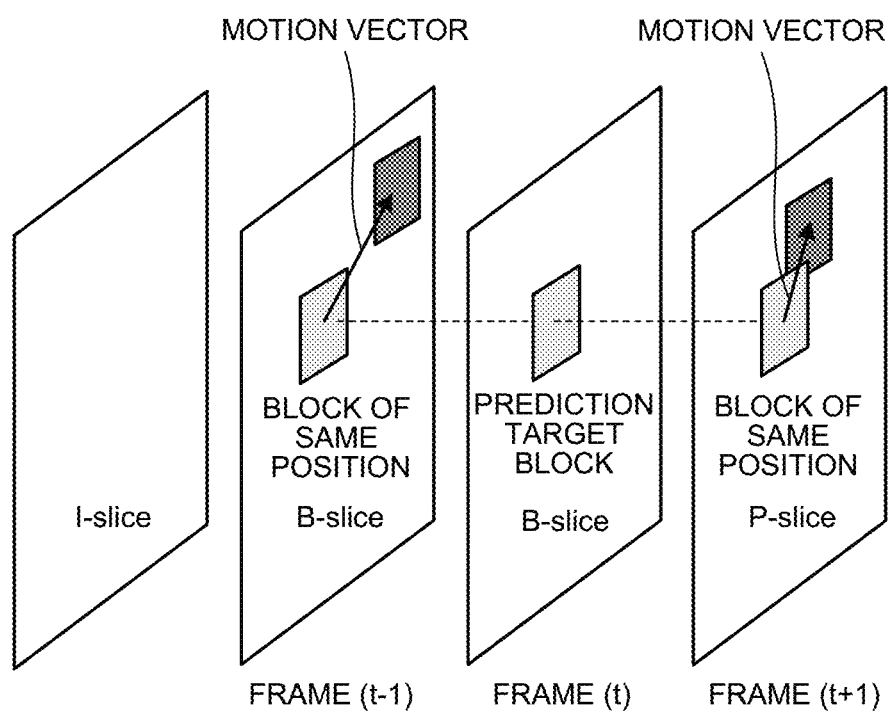
FIG. 5 is a diagram that illustrates an example of the relation between motion vectors for a motion-compensated prediction in a bidirectional prediction according to the first embodiment.

FIG. 5 is a diagram that illustrates an example of the relation between motion vectors for a motion-compensated prediction in a bidirectional prediction according to the first embodiment. In the motion-compensated prediction, an interpolation process is performed using the reference image, and a single-directional predicted image is generated based on deviations of motions of the generated interpolated image and the input image from the pixel block located at the encoding target position. Here, the deviation is a motion vector. As illustrated in FIG. 5, in the bidirectional prediction slice (B-slice), a predicted image is generated by using two types of reference images and a motion vector set. As the interpolation process, an interpolation process of ½-pixel precision, an interpolation process of ¼-pixel precision, or the like is used, and, by performing a filtering process for the reference image, a value of the interpolated image is generated. For example, in H.264 in which an interpolation up to ¼-pixel precision can be performed for a luminance signal, the deviation is represented as four times integer pixel precision.

The single-directional predicted motion compensation unit 203 outputs a single-directional predicted image and temporarily stores the single-directional predicted image in the memory 202. Here, in a case where the motion information (prediction parameter) represents a bi-directional prediction, the multi-frame motion compensation unit 201 makes a weighted prediction using two types of single-directional predicted images. Accordingly, the single-directional predicted motion compensation unit 203 stores a single-directional predicted image corresponding to the first type in the single-directional predicted image in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional predicted motion compensation unit 203, and the WP parameter information input from the motion evaluating unit 109, thereby generating a predicted image. The multi-frame motion compensation unit 201 outputs the predicted image so as to be input to the subtraction unit 101 and the addition unit 106.

Figure 6:
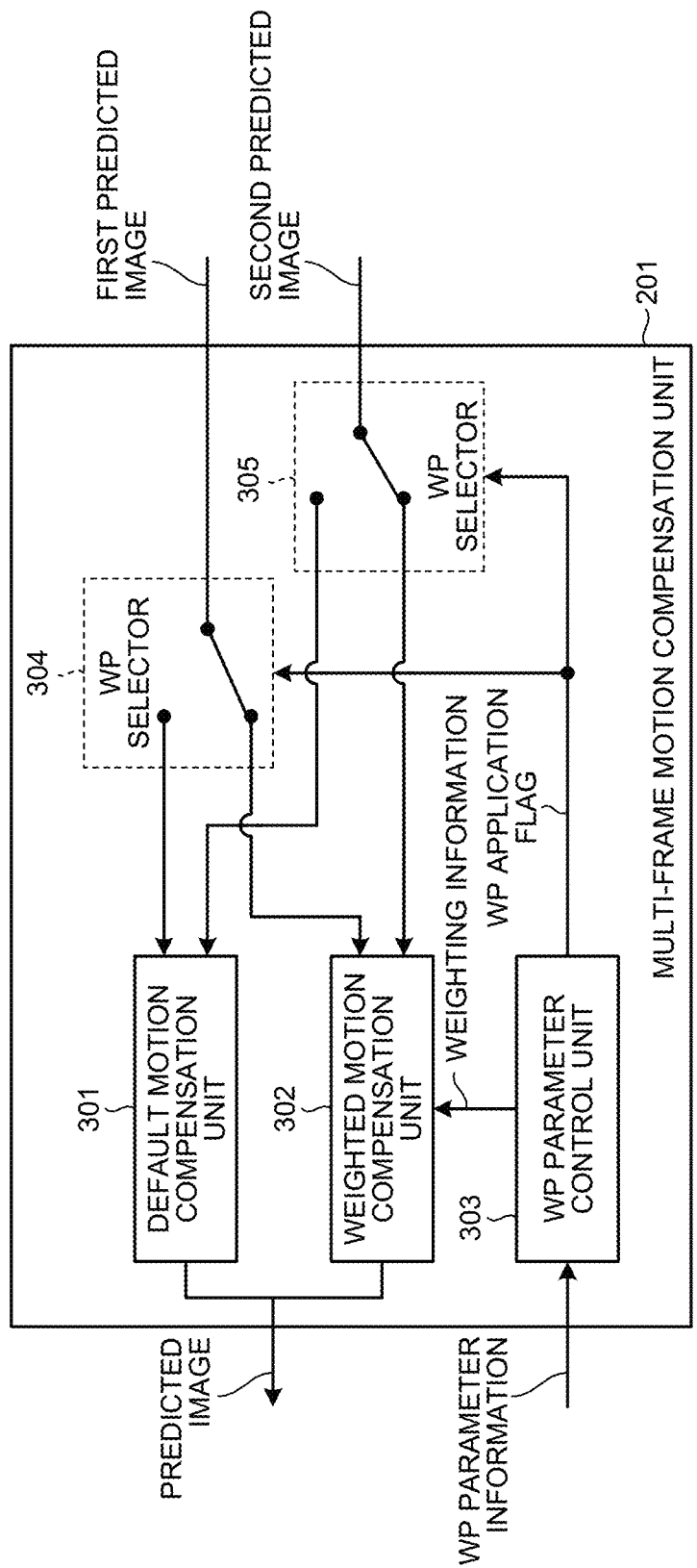
FIG. 6 is a block diagram that illustrates an example of a multi-frame motion compensation unit according to the first embodiment.

FIG. 6 is a block diagram that illustrates an example of the configuration of the multi-frame motion compensation unit 201 according to the first embodiment. As illustrated in FIG.

6, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the motion evaluating unit 109 so as to input the WP application flag to the WP selectors 304 and 305 and input the weighting information to the weighted motion compensation unit 302.

Here, the WP parameter information includes information of the fixed point precision of the weighting factor, a first WP application flag, a first weighting factor, and a first offset corresponding to the first predicted image, and a second WP application flag, a second weighting factor, and a second offset corresponding to the second predicted image. The WP application flag is a parameter that can be set for each corresponding reference image and signal component and represents whether or not a weighted motion compensation prediction is made. The weighting information includes information of the fixed point precision of the weighting factor, the first weighting factor, the first offset, the second weighting factor, and the second offset.

Described in detail, when the WP parameter information is input from the motion evaluating unit 109, the WP parameter control unit 303 outputs the WP parameter information with being divided into the first WP application flag, the second WP application flag, and the weighting information, thereby inputting the first WP application flag to the WP selector 304, inputting the second WP application flag to the WP selector 305, and inputting the weighting information to the weighted motion compensation unit 302.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing based on the two single-directional predicted images (the first and second predicted images) input from the WP selectors 304 and 305, thereby generating a predicted image. More specifically, in a case where the first and second WP application flags are "0", the default motion compensation unit 301 performs average processing based on Numerical Expression (1).

$$P[x,y]=\text{Clip1}((PL0[x,y]+PL1[x,y]+\text{offset2})>>(\text{shift2})) \quad (1)$$

Here, P[x, y] is a predicted image, PL0[x, y] is a first predicted image, and PL1[x, y] is a second predicted image. In addition, offset2 and shift2 are parameters of a rounding process in the average processing and are determined based on the internal calculation precision of the first and second predicted images. When the bit precision of the predicted image is L, and the bit precision of the first and second predicted images is M (L≤M), shift2 is formulated by Numerical Expression (2), and offset2 is formulated by Numerical Expression (3).

$$\text{shift2}=(M-L+1) \quad (2)$$

$$\text{offset2}=(1<<(\text{shift2}-1)) \quad (3)$$

For example, the bit precision of the predicted image is "8", and the bit precision of the first and second predicted images is "14", shift2=7 based on Numerical Expression (2), and offset2=(1<<6) based on Numerical Expression (3).

In addition, in a case where the prediction mode represented by the motion information (prediction parameter) is the single-directional prediction, the default motion compensation unit 301 calculates a final predicted image using only the first predicted image based on Numerical Expression (4).

$$P[x,y]=\text{Clip1}((PLX[x,y]+\text{offset1})>>(\text{shift1})) \quad (4)$$

Here, PLX[x, y] represents a single-directional predicted image (first predicted image), and X is an identifier representing either "0" or "1" as a reference list. For example, PLX[x, y] is PL0[x, y] in a case where the reference list is "0" and is PL1[x, y] in a case where the reference list is "1". In addition, offset1 and shift1 are parameters for a rounding process and are determined based on the internal calculation precision of the first predicted image. When the bit precision of the predicted image is L, and the bit precision of the first predicted image is M, shift1 is formulated by Numerical Expression (5), and offset1 is formulated by Numerical Expression (6).

$$\text{shift1}=(M-L) \quad (5)$$

$$\text{offset1}=(1<<(\text{shift1}-1)) \quad (6)$$

For example, in a case where the bit precision of the predicted image is "8", and the bit precision of the first predicted image is "14", shift1=6 based on Numerical Expression (5), and offset1=(1<<5) based on Numerical Expression (6).

The weighted motion compensation unit 302 performs weighted motion compensation based on the two single-directional predicted images (the first and second predicted images) input from the WP selectors 304 and 305 and the weighting information input from the WP parameter control unit 303. More specifically, the weighted motion compensation unit 302 performs the weighting process based on Numerical Expression (7) in a case where the first and second WP application flags are "1".

$$P[x,y]=\text{Clip1}(((PL0[x,y]*w_{0C}+PL1[x,y]*w_{1C}+ \\ (1<<\log WD_C))>>(\log WD_C+1))+((o_{0C}+o_{1C}+ \\ 1)>>1)) \quad (7)$$

Here, $w_{0C}$ represents a weighting factor corresponding to the first predicted image, $w_{1C}$ represents a weighting factor corresponding to the second predicted image, $o_{0C}$ represents an offset corresponding to the first predicted image, and $o_{1C}$ represents an offset corresponding to the second predicted image. Thereafter, they will be referred to as a first weighting factor, a second weighting factor, a first offset, and a second offset. $\log WD_C$ is a parameter representing fixed point precision of each weighting factor. In addition, a variable C represents a signal component. For example, in the case of a YUV spatial signal, a luminance signal is represented by C=Y, a Cr color difference signal is represented by C=Cr, and a Cb color difference component is represented by C=Cb.

In addition, in a case where the calculation precision of the first and second predicted images and the calculation precision of the predicted image are different from each other, the weighted motion compensation unit 302 realizes a rounding process by controlling $\log WD_C$, which is fixed point precision, as in Numerical Expression (8).

$$\log WD'_C = \log WD_C + \text{offset1} \quad (8)$$

The rounding process can be realized by replacing $\log WD_C$ represented in Numerical Expression (7) with $\log WD'_C$ represented in Numerical Expression (8). For example, in a case where the bit precision of the predicted image is "8", and the bit precision of the first and second predicted images is "14", by resetting $\log WD_C$, it is possible to realize a batch rounding process for the calculation precision similar to that of shift2 represented in Numerical Expression (1).

In addition, in a case where the prediction mode represented by the motion information (prediction parameter) is a single directional prediction, the weighted motion compensation unit 302 calculates a final predicted image using only the first predicted image based on Numerical Expression (9).

$$P[x,y] = \text{Clip1}((PLX[x,y] * w_{XC} + (1 << \log WD_C - 1)) >> (\log WD_C)) \quad (9)$$

Here, PLX[x, y] represents a single-directional predicted image (first predicted image), $w_{XC}$ represents a weighting factor corresponding to the single directional prediction, and X is an identifier representing either "0" or "1" as a reference list. For example, PLX[x, y] and $w_{XC}$ are PL0[x, y] and $w_{0C}$ in a case where the reference list is "0" and are PL1[x, y] and $w_{1C}$ in a case where the reference list is "1".

In addition, in a case where the calculation precision of the first and second predicted images and the calculation precision of the predicted image are different from each other, the weighted motion compensation unit 302 realizes a rounding process by controlling $\log WD_C$, which is fixed point precision, as in Numerical Expression (8), similarly to the case of the bi-directional prediction.

The rounding process can be realized by replacing $\log WD_C$ represented in Numerical Expression (7) with $\log WD'_C$ represented in Numerical Expression (8). For example, in a case where the bit precision of the predicted image is "8", and the bit precision of the first and second predicted images is "14", by resetting $\log WD_C$, it is possible to realize a batch rounding process for the calculation precision similar to that of shift1 represented in Numerical Expression (4).

Figure 7:
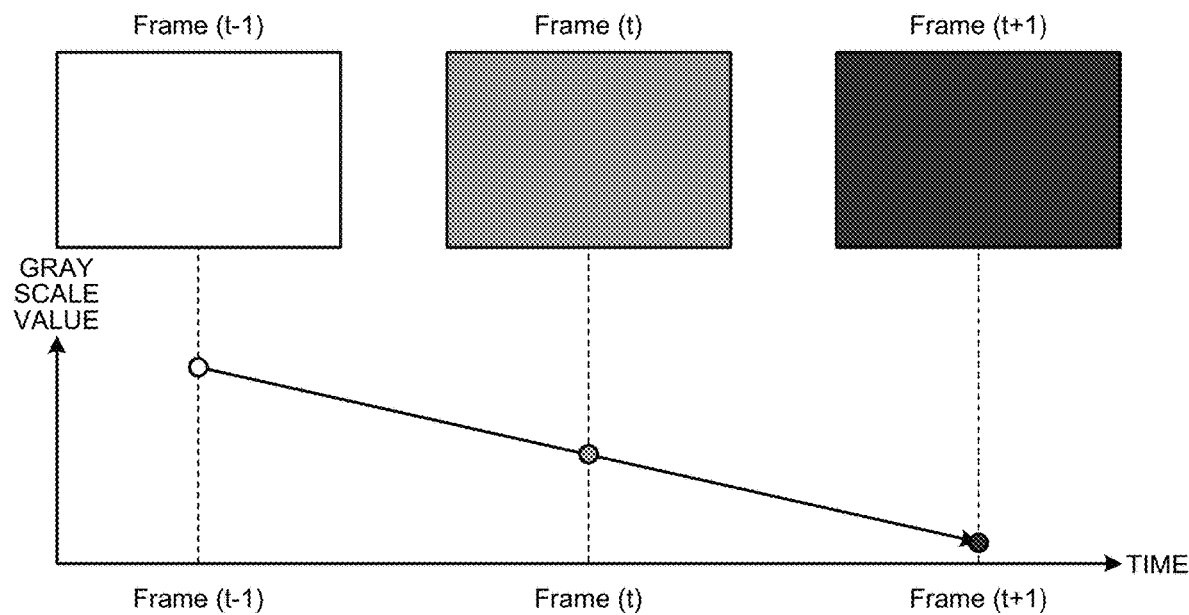
FIG. 7 is an explanatory diagram that illustrates an example of fixed point precision of a weighting factor according to the first embodiment.

FIG. 7 is an explanatory diagram that illustrates an example of fixed point precision of a weighting factor according to the first embodiment and is a diagram that illustrates an example of changes in a moving image having a brightness change in the time direction and a gray scale value. In the example illustrated in FIG. 7, an encoding target frame is Frame(t), a frame that is one frame before the encoding target frame in time is Frame(t−1), and a frame that is one frame after the encoding target frame in time is Frame(t+1). As illustrated in FIG. 7, in a fading image changing from white to black, the brightness (gray scale value) of the image decreases in accordance with elapse of time. The weighting factor represents the degree of change in FIG. 7, and, as is apparent from Numerical Expressions (7) and (9), takes a value of "1.0" in a case where there is no change in the brightness. The fixed point precision is a parameter controlling an interval width corresponding to a decimal point of the weighing factor, and the weighting factor is $1 << \log WD_C$ in a case where there is no change in brightness.

In addition, in the case of a single directional prediction, various parameters (the second WP application flag, the second weighting factor, and the second offset information) corresponding to the second predicted image are not used and may be set to initial values determined in advance.

Referring back to FIG. 1, the motion evaluating unit 109 performs a motion evaluation between a plurality of frames based on an input image and a reference image input from the predicted image generating unit 107 and outputs the motion information and the WP parameter information, thereby inputting the motion information to the predicted image generating unit 107 and the encoding unit 110 and inputting the WP parameter information to the predicted image generating unit 107 and the index setting unit 108.

The motion evaluating unit 109 calculates an error, for example, by calculating differences between an input image of a prediction target pixel block and a plurality of reference images corresponding to the same position as a starting point, shifts the position with fractional precision, and calculates optimal motion information using a technique such as block matching for finding a block of a minimal error or the like. In the case of a bi-directional prediction, the motion evaluating unit 109 performs block matching including a default motion compensation prediction as represented in Numerical Expressions (1) and (4) using the motion information derived from the single-directional prediction, thereby calculating motion information of the bidirectional prediction.

At this time, the motion evaluating unit 109 can calculate the WP parameter information by performing block matching including a weighted motion compensation prediction as represented in Numerical Expressions (7) and (9). In addition, for the calculation of the WP parameter information, a method of calculating a weighting factor or an offset using a brightness gradient of the input image, a method of calculating a weighting factor or an offset in accordance with the accumulation of a prediction error at the time of encoding, or the like may be used. Furthermore, as the WP parameter information, a fixed value determined in advance for each encoding device may be used.

Here, a method of calculating a weighting factor, the fixed point precision of the weighting factor, and an offset from a moving image having a brightness change in time will be described with reference to FIG. 7. As described above, in the fading image changing from white to black as illustrated in FIG. 7, the brightness (gray scale value) of the image decreases in accordance with the elapse of time. The motion evaluating unit 109 can calculate the weighting factor by calculating the slope thereof.

The fixed point precision of the weighting factor is information representing the precision of the slope, and the motion evaluating unit 109 can calculate an optimal value based on a distance to the reference image in time and the degree of change of the image brightness. For example, in FIG. 7, in a case where the weighting factor between Frame(t−1) and Frame(t+1) is 0.75 with fractional precision, ¾ can be represented in the case of ¼ precision, and accordingly, the motion evaluating unit 109 sets the fixed point precision to 2 (1<<2). Since the value of the fixed point precision influences on the code amount of a case where the weighting factor is encoded, as the value of the fixed point precision, an optimal value may be selected in consideration of the code amount and the prediction precision. In addition, the value of the fixed point precision may be a fixed value determined in advance.

In addition, in a case where the slope is not matched, the motion evaluating unit 109 can calculate the value of the offset by acquiring a correction value (deviation amount) corresponding to the intercept of the linear function. For example, in FIG. 7, in a case where a weighing factor between Frame(t−1) and Frame(t+1) is 0.60 with decimal point precision, and the fixed point precision is "1" (1<<1), there is a high possibility that the weighting factor is set to "1" (corresponding to decimal point precision of 0.50 of the weighting factor). In such a case, since the decimal point precision of the weighting factor deviates from 0.60, which is an optimal value, by 0.10, the motion evaluating unit 109 calculates a correction value corresponding thereto based on a maximum value of the pixel and is set as the value of the offset. In a case where the maximum value of the pixel is 255, the motion evaluating unit 109 may set a value such as 25 (255×0.1).

In the first embodiment, although the motion evaluating unit 109 is represented as one function of the encoding device 100 as an example, the motion evaluating unit 109 is not an essential configuration of the encoding device 100, and, for example, the motion evaluating unit 109 may be a device other than the encoding device 100. In such a case, the motion information and the WP parameter information calculated by the motion evaluating unit 109 may be loaded into the encoding device 100.

The index setting unit 108 receives the WP parameter information input from the motion evaluating unit 109, checks a reference list (list number) and a reference image (reference number), and outputs index information so as to be input to the index setting unit 108.

Figure 8:
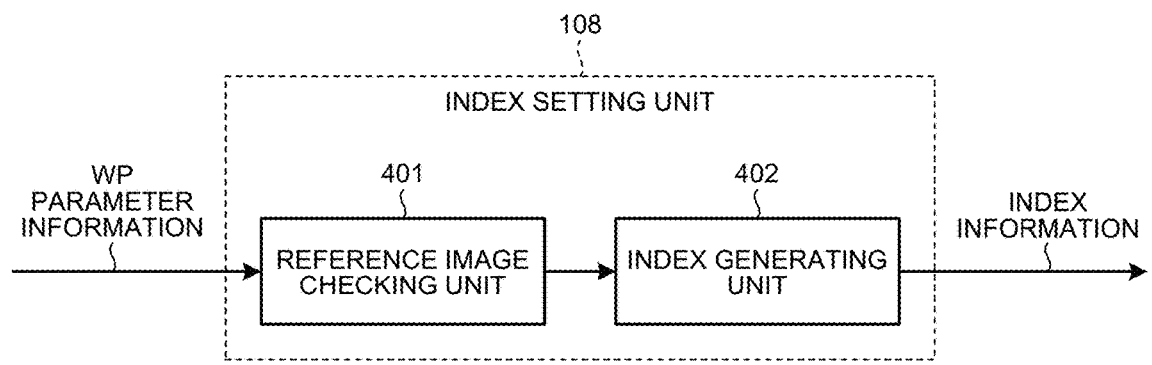
FIG. 8 is a block diagram that illustrates an example of an index setting unit according to the first embodiment.

FIG. 8 is a block diagram that illustrates an example of the configuration of the index setting unit 108 according to the first embodiment. The index setting unit 108, as illustrated in FIG. 8, includes a reference image checking unit 401 and an index generating unit 402.

The reference image checking unit 401 receives the WP parameter information input from the motion evaluating unit 109 and checks whether or not there are WP parameters representing a reference image having the same reference number included in two reference lists. Then, the reference image checking unit 401 removes the WP parameter representing the same reference image included in the WP parameter information and outputs the WP parameter information after removal so as to be input to the index generating unit 402.

The index generating unit 402 receives the WP parameter information in which the redundant WP parameter has been removed from the reference image checking unit 401 and generates index information by mapping the WP parameter information into a syntax element to be described later. The index generating unit 402 outputs the index information so as to be input to the encoding unit 110.

FIGS. 9A and 9B are diagrams illustrating examples of the WP parameter information according to the first embodiment. An example of the WP parameter information at the time of P-slice is as illustrated in FIG. 9A, and an example of the WP parameter information at the time of B-slice is as illustrated in FIGS. 9A and 9B. A list number is an identifier representing a prediction direction. The list number has a value of "0" in the case of a single-directional prediction. On the other hand, in the case of a bi-directional prediction, two types of prediction can be used, and accordingly, the list number has two values of "0" and "1". A reference number is a value corresponding to any one of 1 to N represented in the frame memory 206. Since the WP parameter information is maintained for each reference list and reference image, in a case where there are N reference images, 2N pieces of information are necessary at the time of B-slice. The reference image checking unit 401 reconverts the WP parameter information and removes the redundant WP parameter.

Figures 10, 11:
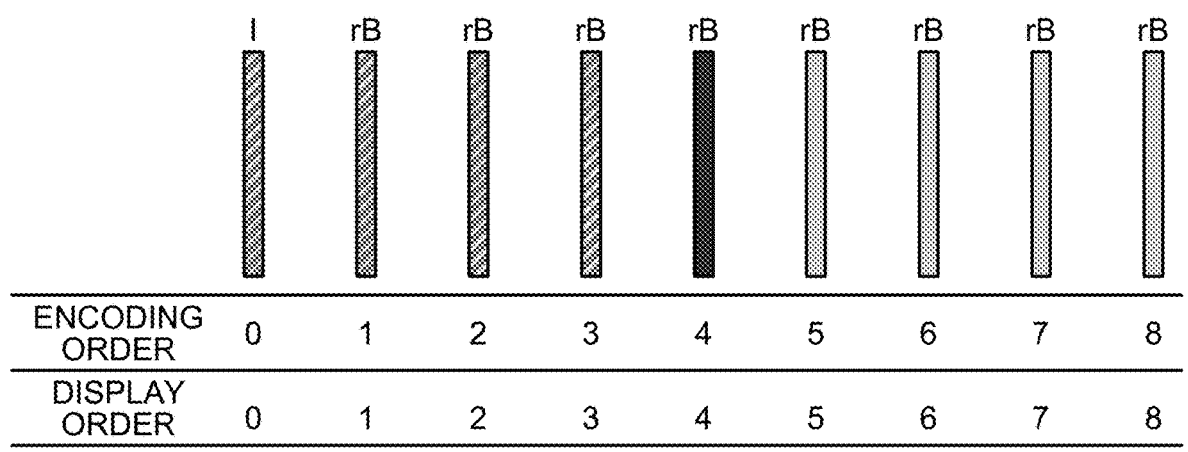
FIG. 10 is a diagram that illustrates an example of an encoding order and a display order in a low-delay encoding structure according to the first embodiment.
FIG. 11 is a diagram that illustrates an example of the relation between a reference image and a reference number in the low-delay encoding structure according to the first embodiment.

FIG. 10 is a diagram that illustrates an example of an encoding order and a display order (POC: picture order count) in a low-delay encoding structure according to the first embodiment and illustrates an example of an encoding structure in which a B-slice that can be a reference image is used as an rB-slice. In the low-delay encoding structure, an image cannot be predicted, and the encoding order and the display order are the same. Here, a case will be considered in which frames 0 to 3 have been encoded in the display order, and a frame 4 is encoded.

FIG. 11 is a diagram that illustrates an example of the relation between a reference image and a reference number in the low-delay encoding structure according to the first embodiment and illustrates the relation between a reference image and a reference number of a case where the frame 4 is encoded using simplified WP parameter information. In the example illustrated in FIG. 11, the order of reference numbers within a reference list is the same in Lists 0 and 1, which represents that the reference images of Lists 0 and 1 are the same.

Figures 12, 13:
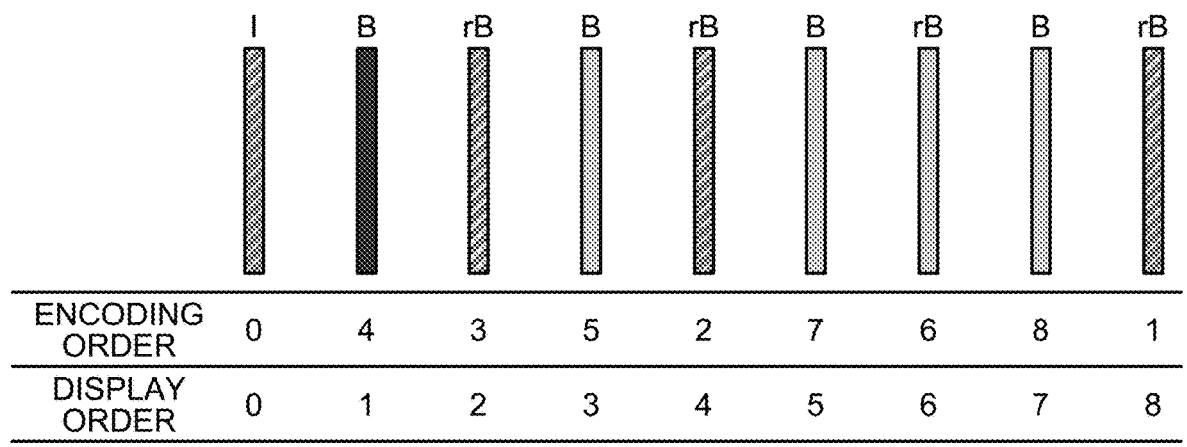
FIG. 12 is a diagram that illustrates an example of an encoding order and a display order in a random access encoding structure according to the first embodiment.
FIG. 13 is a diagram that illustrates an example of the relation between a reference image and a reference number in the random access encoding structure according to the first embodiment.

FIG. 12 is a diagram that illustrates an example of an encoding order and a display order in a random access encoding structure according to the first embodiment. Here, a case will be considered in which frames 0, 2, 4, and 8 have been encoded in the display order, and a frame 1 is encoded.

FIG. 13 is a diagram that illustrates an example of the relation between a reference image and a reference number in the random access encoding structure according to the first embodiment and illustrates the relation between a reference image and a reference number of a case where a frame 1 is encoded using simplified WP parameter information. In the example illustrated in FIG. 13, while the orders of reference numbers for the reference lists are different from each other, common four reference images are included in Lists 0 and 1, which represents the reference images of Lists 0 and 1 are the same.

In order to remove redundant WP parameters, in other words, the WP parameters in which reference numbers included in two reference lists represent the same reference images, the reference image checking unit 401 sorts the reference numbers so as to be converted into a common new index.

FIG. 14 is a diagram that illustrates an example of the scanning order of a list number and a reference number of a reference image according to the first embodiment. The reference image checking unit 401, in the scanning order illustrated in FIG. 14, a two-dimensional reference list (two reference lists) is converted into a one-dimensional common list (one common list). More specifically, the reference image checking unit 401 reads the WP parameter information represented in FIGS. 9A and 9B in the scanning order illustrated in FIG. 14, sorts the two reference lists into a common list, and removes redundant WP parameters. Here, the reference image checking unit 401 reads the WP parameter information in accordance with a pseudo code represented in Numerical Expression (10).

```
for (scan = 0; scan <= num_of_common_active_ref_minus1;
scan++){
list = common_scan_list(scan)
ref_idx = common_scan_ref_idx(scan)
refPOC = RefPicOrderCount (list, ref_idx)
identical_ref_flag = false;
for (currIdx = 0; currIdx <= num_of_common_active_ref_minus1;
currIdx++){
if(refPOC == CommonRefPicOrderCount(currIdx)){
identical_ref_flag = true;
```

```
}
}
if(!identical_ref_flag)
InsertCommonRefPicOrderCount(scan, refPOC);
}
```
(10)

Here, common_scan_list( ) is a function for returning a list number corresponding to a scanning number illustrated in FIG. 14. In addition, common_scan_ref_idx( ) is a function for returning a reference number corresponding to a scanning number illustrated in FIG. 14. RefPicOrderCnt( ) is a function for returning a POC number corresponding to a list number and a reference number. Here, the POC number is a number that represents the display order of reference images. When exceeding a maximum number determined in advance, the POC number is mapped into an initial value. For example, in a case where the maximum value of the POC number is 255, a POC number corresponding to 256 is 0.

CommonRefPicOrderCount( ) is a function for returning a POC number corresponding to a reference number of a common list (CommonList). InsertCommonRefPicOrderCount( ) is a function for inserting a POC number corresponding to a scanning number into a common list (CommonList).

Here, the scanning order illustrated in FIG. 14 is an example, any other scanning order may be used as long as it is a scanning order determined in advance. In addition, the pseudo code represented in Numerical Expression (10) is an example, and addition of a process or removal of a redundant process can be performed as long as the purpose of this process can be realized.

FIGS. 15 and 16 are diagrams that illustrate an example of the WP parameter information after a common list conversion according to the first embodiment in a simplified manner. FIG. 15 illustrates the WP parameter information of a common list that is acquired by converting the WP parameter information of the reference list illustrated in FIG. 11 in a simplified manner, and FIG. 16 illustrates the WP parameter information of a common list that is acquired by converting the WP parameter information of the reference list illustrated in FIG. 13 in a simplified manner.

Figure 17:
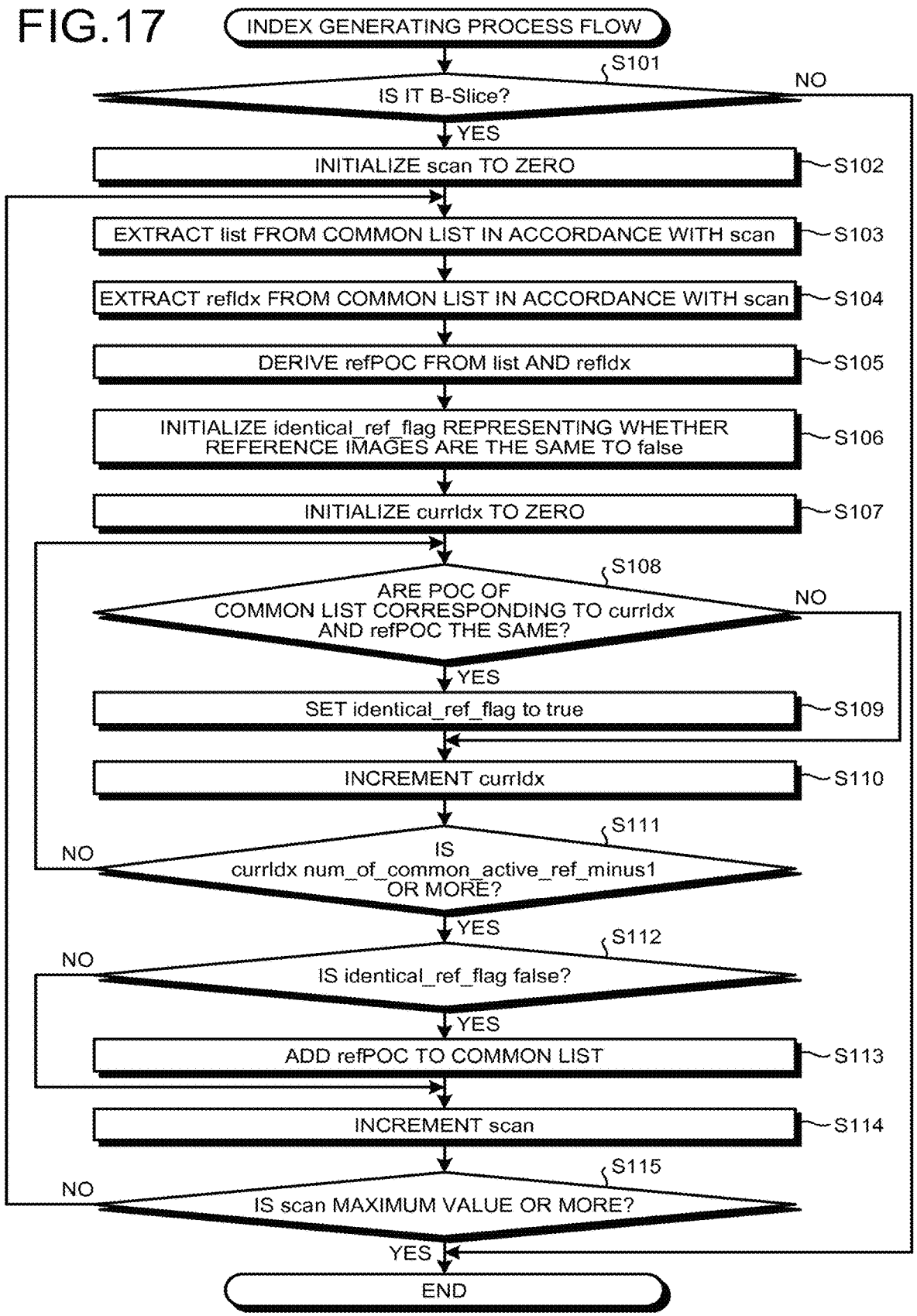
FIG. 17 is a flowchart that illustrates an example of the process of generating index information according to the first embodiment.

FIG. 17 is a flowchart that illustrates an example of the process of generating index information that is performed by the index setting unit 108 according to the first embodiment.

When WP parameter information is input, the reference image checking unit 401 branches the process in accordance with the type of a slice (Step S101).

In a case where the slice type is a single-directional prediction slice (P-slice) using only one reference list (No in Step S101), the reference image checking unit 401 directly outputs the WP parameter information illustrated in FIG. 9A to the index generating unit 402. The index generating unit 402 generates index information by mapping the WP parameter information input from the reference image checking unit 401 into a predetermined syntax element to be described later and outputs the generated index information.

On the other hand, in a case where the slice type is a bi-directional prediction slice (B-slice) using two reference lists (Yes in Step S101), the reference image checking unit 401 initializes a variable scan to zero (Step S102). The variable scan represents a scanning number illustrated in FIG. 14.

Subsequently, the reference image checking unit 401 acquires a variable list representing a list number corresponding to a scanning number using the variable scan (Step S103) and acquires a variable refIdx representing a reference number corresponding to the scanning number (Step S104).

Subsequently, the reference image checking unit 401 derives a variable refPOC representing a POC number of the reference image corresponding to a list number represented by the variable list and the reference number represented by the variable refIdx (Step S105).

Subsequently, the reference image checking unit 401 sets a flag identical_ref_flag to false (Step S106) and sets a variable currIdx to "0" (Step S107). The flag identical_ref_flag represents whether or not there is the same reference image in the common list. The variable currIdx represents a reference number of the common list.

Subsequently, the reference image checking unit 401 determines whether or not the POC number represented by the derived variable refPOC and the POC number of the reference image corresponding to the reference number represented by the variable currIdx are the same (Step S108).

In a case where both the POC numbers are the same (Yes in Step S108), the reference image checking unit 401 sets the flag identical_ref_flag to true (Step S109). On the other hand, in a case where both the POC numbers are not the same (No in Step S108), the process of Step S109 is not performed.

Subsequently, the reference image checking unit 401 increments the variable currIdx (Step S110).

Subsequently, the reference image checking unit 401 determines whether the value of the variable currIdx is larger than num_of_common_active_ref_minus1 that is a value acquired by subtracting one from a maximum number of the common list (Step S111). Then, when the value is num_of_common_active_ref_minus1 or less (No in Step S111), the process of Steps S108 to S110 is repeated.

When the value is larger than num_of_common_active_ref_minus1 (Yes in Step S111), the reference image checking unit 401 completes the checking of the common list and further checks whether or not the flag identical_ref_flag is false (Step S112).

In a case where the flag identical_ref_flag is false (Yes in Step S112), the reference image checking unit 401 determines that a reference image that is the same as the reference image of the POC number represented by the variable refPOC is not included in the common list and adds the POC number represented by the variable refPOC to the common list (Step S113). On the other hand, in a case where the flag identical_ref_flag is true (No in Step S112), the reference image checking unit 401 determines that a reference image that is the same as the reference image of the POC number represented by the variable refPOC is included in the common list and does not perform the process of Step S113.

Subsequently, the reference image checking unit 401 increments the variable scan (Step S114).

Subsequently, the reference image checking unit 401 determines whether the value of the variable scan is num_of_common_active_ref_minus1, which is a value acquired by subtracting one from a maximum number of the common list, or more (Step S115). In a case where the value of the variable scan is num_of_common_active_ref_minus1 or less (No in Step S115), the process is returned to Step S103. On the other hand, in a case where the value of the variable scan is larger than num_of_common_active_ref_minus1 (Yes in Step S115), the reference image checking unit 401 outputs the WP parameter information after the conversion into the common list to the index generating unit 402. The index generating unit 402 generates index information by mapping the WP parameter information input from the reference image checking unit 401 into a predetermined syntax element to be described later and outputs the generated index information.

Referring back to FIG. 1, the encoding unit 110 performs entropy encoding of various encoding parameters such as the quantization transformation coefficient input from the quantization unit 103, the motion information input from the motion evaluating unit 109, the index information input from the index setting unit 108, and the quantization information designated by the encoding control unit 111, thereby generating encoded data. As the entropy encoding, for example, there is a Huffman encoding or arithmetic coding.

Here, the encoding parameters are parameters such as prediction information representing a prediction method or the like, information relating to the quantization transformation coefficient, and information relating to quantization that are necessary for a decoding process. For example, it may be configured such that an internal memory not illustrated in the figure is included in the encoding control unit 111, the encoding parameters are maintained in the internal memory, and the encoding parameters of an adjacent pixel block, which has been completed to be encoded, is used when a pixel block is encoded. For example, in an intra-prediction of H.264, prediction information of a pixel block may be derived from the prediction information of an adjacent block that has been completed to be encoded.

The encoding unit 110 outputs the generated encoded data at appropriate output timing managed by the encoding control unit 111. Various kinds of information, which is output encoded data, for example, is multiplexed by a multiplexing unit not illustrated in the figure or the like, is temporarily stored in an output buffer not illustrated in the figure or the like, and, then, for example, is output to a storage system (storage medium) or a transmission system (communication line).

Figure 18:
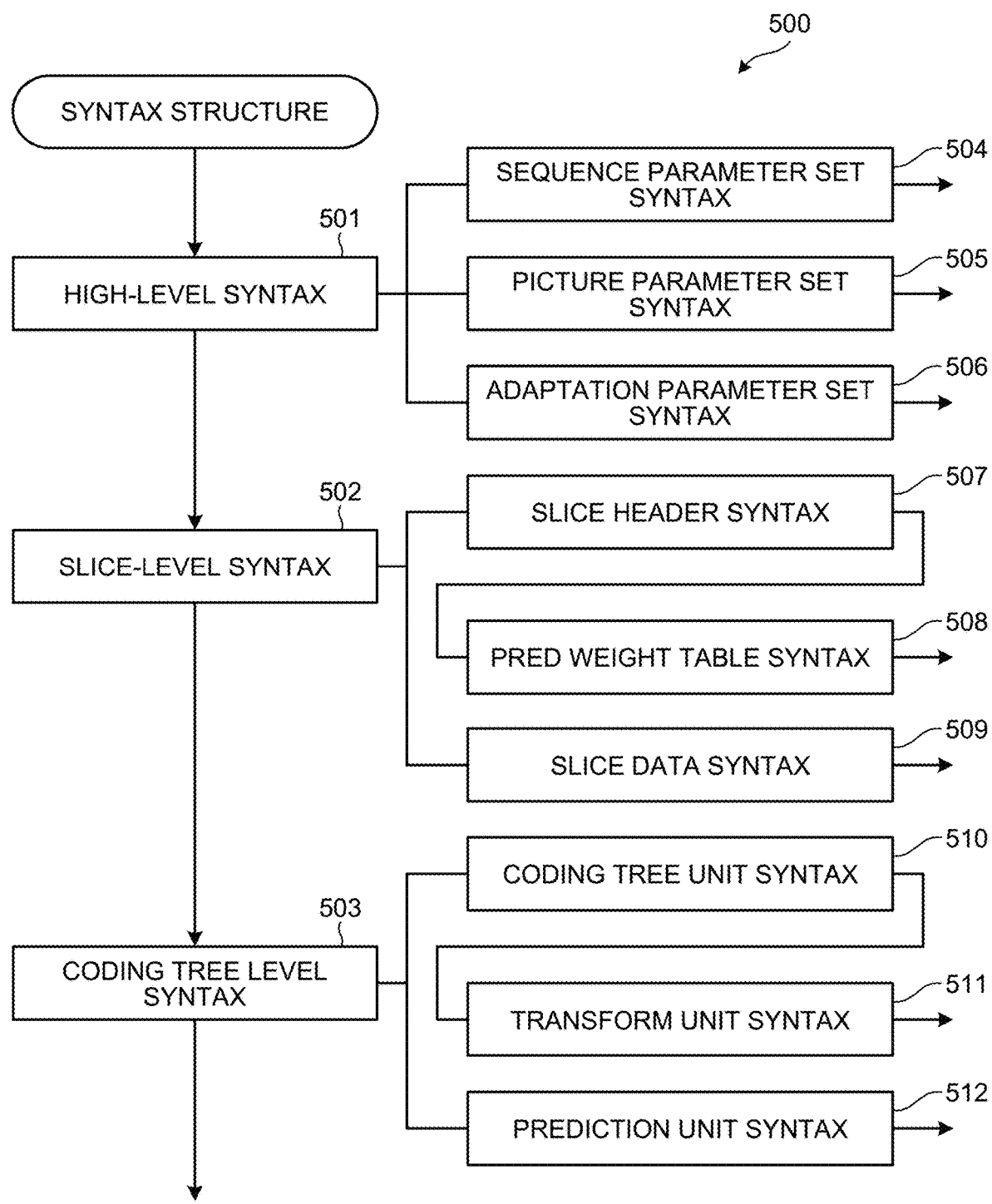
FIG. 18 is a diagram that illustrates an example of syntax according to the first embodiment.

FIG. 18 is a diagram that illustrates an example of syntax 500 used by the encoding device 100 according to the first embodiment. The syntax 500 illustrates the structure of encoded data generated by encoding an input image (moving image data) using the encoding device 100. When the encoded data is decoded, a decoding device to be described later performs a syntax analysis of a moving image by referring to a syntax structure that is the same as that of the syntax 500.

The syntax 500 includes three parts including a high-level syntax 501, a slice-level syntax 502, and a coding tree level syntax 503. The high-level syntax 501 includes syntax information of an upper layer that has a level higher than the slice. Here, the slice represents a rectangular area or a continuous area included in a frame or a field. The slice-level syntax 502 includes information that is necessary for decoding each slice. The coding tree level syntax 503 includes information that is necessary for decoding each coding tree (in other words, each coding tree block). Each of these parts includes more detailed syntax.

The high-level syntax 501 includes syntax of a sequence and a picture level such as a sequence parameter set syntax 504, a picture parameter set syntax 505, and an adaptation parameter set syntax 506.

The slice-level syntax 502 includes a slice header syntax 507, a pred weight table syntax 508, a slice data syntax 509, and the like. The pred weight table syntax 508 is called from the slice header syntax 507.

The coding tree level syntax 503 includes a coding tree unit syntax 510, a transform unit syntax 511, a prediction unit syntax 512, and the like. The coding tree unit syntax 510 may have a quadtree structure. More specifically, the coding tree unit syntax 510 may be recursively further called as a syntax element of the coding tree unit syntax 510. In other words, one coding tree block may be subdivided into quadtrees. In addition, the transform unit syntax 511 is included in the coding tree unit syntax 510. The transform unit syntax 511 is called from each coding tree unit syntax 510 located at a tail end of the quadtree. In the transform unit syntax 511, information relating to inverse orthogonal transformation, quantization, and the like is described. In the syntax, information relating to the weighted motion compensation prediction may be described.

FIG. 19 is a diagram that illustrates an example of the picture parameter set syntax 505 according to the first embodiment. Here, weighted_pred_flag, for example, is a syntax element representing the validness or invalidness of a weighted compensation prediction according to the first embodiment for a P-slice. In a case where the weighted_pred_flag is "0", the weighted motion compensation prediction according to the first embodiment within the P-slice is invalid. Accordingly, the WP application flag included in the WP parameter information is constantly set to "0", and the output ends of the WP selectors 304 and 305 are connected to the default motion compensation unit 301. On the other hand, in a case where the weighted_pred_flag is "1", the weighted motion compensation prediction according to the first embodiment within the P-slice is valid.

As another example, in a case where the weighted_pred_flag is "1", the validness or invalidness of the weighted motion compensation prediction according to the first embodiment may be defined for each local area within the slice in the syntax of a lower layer (the slice header, the coding tree block, the transform unit, the prediction unit, and the like).

In addition, weighted_bipred_idc, for example, is a syntax element representing the validness or invalidness of a weighted compensation prediction according to the first embodiment for a B-slice. In a case where the weighted_bipred_idc is "0", the weighted motion compensation prediction according to the first embodiment within the B-slice is invalid. Accordingly, the WP application flag included in the WP parameter information is constantly set to "0", and the output ends of the WP selectors 304 and 305 are connected to the default motion compensation unit 301. On the other hand, in a case where the weighted_bipred_idc is "1", the weighted motion compensation prediction according to the first embodiment within the B-slice is valid.

As another example, in a case where the weighted_bipred_idc is "1", the validness or invalidness of the weighted motion compensation prediction according to the first embodiment may be defined for each local area within the slice in the syntax of a lower layer (the slice header, the coding tree block, the transform unit, the prediction unit, and the like).

FIG. 20 is a diagram that illustrates an example of the slice header syntax 507 according to the first embodiment. Here, slice-type represents the type (an I-slice, a P-slice, a B-slice, or the like) of slice. In addition, pic_parameter_set_id is an identifier representing which picture parameter set syntax 505 to be referred. num_ref_idx_active_override_flag is a flag representing whether to update the number of valid reference images, and, in a case where this flag is "1", num_ref_idx_l0_active_minus1 and num_ref_idx_l1_active_minus1 that define the numbers of reference images of the reference list may be used. In addition, pred_weight_table( ) is a function representing the pred weight table syntax used for a weighted motion compensation prediction, and this function is called in a case where the weighted_pred_flag is "1" in the case of a P-slice and a case where weighted_bipred_idc is "1" in the case of a B-slice.

FIG. 21 is a diagram that illustrates an example of the pred weight table syntax 508 according to the first embodiment. Here, luma_log2_weight_denom represents the fixed point precision of the weighting factor of the luminance signal in a slice and is a value corresponding to $\log WD_C$ represented in Numerical Expression (7) or (9). In addition, chroma_log2_weight_denom represents the fixed point precision of the weighting factor of a color difference signal in a slice and is a value corresponding to $\log WD_C$ represented in Numerical Expression (7) or (9). chroma_format_idc is an identifier representing a color space, and MONO_IDX is a value representing a monochrome video. In addition, num_ref_common_active_minus1 represents a value that is acquired by subtracting one from the number of reference images included in a common list in a slice and is used in Numerical Expression (10). A maximum value of this value is acquired by adding maximum values of the numbers of reference images of two Lists 0 and 1.

luma_weight_common_flag represents a WP application flag of a luminance signal. In a case where this flag is "1", a weighted motion compensation prediction of the luminance signal according to the first embodiment is valid for the whole area within the slice. In addition, chroma_weight_common_flag represents a WP application flag of a color difference signal. In a case where this flag is "1", a weighted motion compensation prediction of a color difference signal according to the first embodiment is valid for the whole area within the slice. Here, luma_weight_common[i] is a weighting factor of the i-th luminance signal managed in the common list. In addition, luma_offset_common[i] is an offset of the i-th luminance signal managed in the common list. These are values corresponding to $w_{0C}$, $w_{1C}$, $o_{0C}$, and $o_{1C}$ represented in Numerical Expression (7) or (9). Here, C=Y.

Here, chroma_weight_common[i][j] is a weighting factor of the i-th color difference signal managed in the common list. In addition, chroma_offset_common[i][j] is an offset of the i-th color difference signal managed in the common list. These are values corresponding to $w_{0C}$, $w_{1C}$, $o_{0C}$, $o_{1C}$ represented in Numerical Expression (7) or (9). Here, C=Cr or Cb. In addition, j represents a component of the color difference, and, for example, in the case of a signal of YUV 4:2:0, j=0 represents a Cr component, and j=1 represents a Cb component.

As above, in the first embodiment, in a case where there are combinations including the same reference image in two reference lists of Lists 0 and 1 in the WP parameter information, the index setting unit 108 converts the two reference lists into a common list, thereby removing a redundant WP parameter that is duplicate based on the WP parameter information and generating index information. Therefore, according to the first embodiment, the code amount of the index information can be reduced.

Particularly, since the weighting factor and the offset need to be encoded for each reference image, the amount of information to be signaled to the decoder increases in accordance with an increase in the number of reference images. However, as the number of reference images increases, the number of cases where the same reference image is referred to in the reference list increases, and accordingly, by managing a common list, an advantage of markedly reducing the code amount can be expected.

Modification of First Embodiment

A modification of the first embodiment will be described. In the modification of the first embodiment, syntax elements used by the index generating unit 402 are different from those of the first embodiment.

FIG. 22 is a diagram that illustrates an example of a sequence parameter set syntax 504 according to a modification of the first embodiment. Here, profile_idc is an identifier representing information relating to a profile of encoded data. level_idc is an identifier representing information relating to a level of encoded data. In addition, seq_parameter_set_id is an identifier representing a sequence parameter set syntax 504 that is referred to. num_ref_frames is a variable representing a maximal number of reference images in a frame. In addition, weighted_prediction_enabled_flag, for example, is a syntax element representing the validness/invalidness of a weighted motion compensation prediction according to the modification for encoded data.

In a case where weighted_prediction_enabled_flag is "0", a weighted motion compensation prediction according to the modification in the encoded data is invalid. Accordingly, the WP application flag included in the WP parameter information is constantly set to "0", and the WP selectors 304 and 305 connect the output ends thereof to the default motion compensation unit 301. On the other hand, in a case where weighted_prediction_enabled_flag is "1", a weighted motion compensation prediction according to the modification is valid in the whole area of the encoded data.

As another example, in a case where weighted_prediction_enabled_flag is "1", the validness/invalidness of a weighted motion compensation prediction according to the modification may be defined for each local area inside the slice in syntax of a further lower layer (a picture parameter set, an adaptation parameter set, a slice header, a coding tree block, a transform unit, a prediction unit, and the like).

FIG. 23 is a diagram that illustrates an example of the adaptation parameter set syntax 506 according to a modification of the first embodiment. The adaptation parameter set syntax 506 maintains a parameter influencing the whole encoding frame and is independently encoded as a higher-level unit. For example, in H.264, a syntax element corresponding to a high-level syntax 501 is encoded as a NAL unit. Accordingly, the encoding unit of the adaptation parameter set syntax 506 is different from that of syntax of a level lower than the level of the slice-level syntax 502 that maintains a parameter of lower-level information represented by a slice or a pixel block Here, aps_id is an identifier representing an adaptation parameter set syntax 506 that is referred to. By referring to this identifier, a lower-level slice can refer to an arbitrary aps_id that has been encoded. In such a case, for example, by adding the same aps_id to the slice header syntax 507 represented in FIG. 20, a parameter influencing the whole frame can be read.

aps_weighted_prediction_flag, for example, is a syntax element representing the validness or invalidness of a weighted motion compensation prediction according to the modification for a P-slice in a frame. In a case where aps_weighted_prediction_flag is "0", a weighted motion compensation prediction according to the modification for a P-slice within the frame is invalid. Accordingly, the WP application flag included in the WP parameter information is constantly set to "0", and the WP selectors 304 and 305 connect the output ends thereof to the default motion compensation unit 301. On the other hand, in a case where aps_weighted_prediction_flag is "1", a weighted motion compensation prediction according to the modification is valid for the whole area within the frame.

In addition, as another example, in a case where aps_weighted_prediction_flag is "1", in syntax of a lower layer (a slice header, a coding tree block, a transform unit, a prediction unit, and the like), the validness or invalidness of a weight motion compensation prediction according to the modification may be defined for each local area inside the slice.

aps_weighted_bipred_idx, for example, is a syntax element representing the validness or invalidness of a weighted motion compensation prediction according to the modification for a B-slice in a frame. In a case where aps_weighted_bipred_idx is "0", a weighted motion compensation prediction according to the modification for a P-slice within the frame is invalid. Accordingly, the WP application flag included in the WP parameter information is constantly set to "0", and the WP selectors 304 and 305 connect the output ends thereof to the default motion compensation unit 301. On the other hand, in a case where aps_weighted_bipred_idx is "1", a weighted motion compensation prediction according to the modification is valid for the whole area within the frame.

In addition, as another example, in a case where aps_weighted_bipred_idx is "1", in syntax of a lower layer (a slice header, a coding tree block, a transform unit, a prediction unit, and the like), the validness or invalidness of a weight motion compensation prediction according to the modification may be defined for each local area inside the slice.

Furthermore, pred_weight_table( ) is a function representing a pred weight table syntax used for a weighted motion compensation prediction, and this function is called in a case where aps_weighted_prediction_flag described above is "1" or aps_weighted_bipred_idx is "1".

FIG. 24 is a diagram that illustrates an example of the pred weight table syntax 508 according to a modification of the first embodiment. In the modification of the first embodiment, in the syntax structure illustrated in FIG. 18, the pred weight table syntax 508 is called from the adaptation parameter set syntax 506. A difference from the pred weight table syntax 508 illustrated in FIG. 21 is that, num_ref_common_active_minus1 is replaced by MAX_COMMON_REF_MINUS1. Since the number of reference images is described in the slice header syntax 507, it cannot be referred to in the adaptation parameter set syntax 506 that is a higher-level layer. Accordingly, for example, a value acquired by subtracting one from the value of num_ref_frames described in the sequence parameter set syntax 504 is set to MAX_COMMON_REF_MINUS1. In addition, a value taken as a maximum number of reference images may be set in accordance with a predetermined profile or level. The other syntax elements are the same as those illustrated in FIG. 21.

As above, according to the modification of the first embodiment, by employing a structure in which the pred weight table syntax 508 is called from the adaptation parameter set syntax 506, the code amount of the WP parameter information at the time of dividing one frame into a plurality of slices can be markedly reduced.

For example, by encoding the adaptation parameter set syntax 506 having mutually-different three types of used WP parameter information first and calling necessary WP parameter information from the slice header syntax 507 using aps_id depending on the situations, the code amount can be smaller than that of a configuration in which the WP parameter information is constantly encoded by the slice header syntax 507.

Second Embodiment

A second embodiment will be described. In an encoding device 600 according to the second embodiment, the configuration of an index setting unit 608 is different from that of the encoding device 100 according to the first embodiment. Hereinafter, differences from the first embodiment will be mainly described, the same name/reference numeral as those of the first embodiment will be assigned to each constituent element having the same function as that of the first embodiment, and the description thereof will not be presented.

Figure 25:
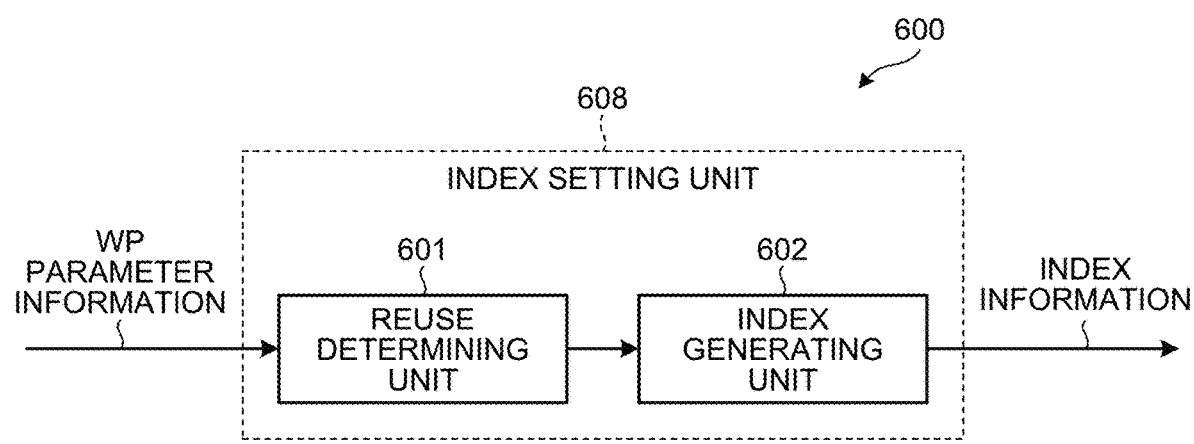
FIG. 25 is a block diagram that illustrates an example of the configuration of an index setting unit according to a second embodiment.

FIG. 25 is a block diagram that illustrates an example of the configuration of the index setting unit 608 according to the second embodiment. The index setting unit 608, as illustrated in FIG. 25, includes a reuse determining unit 601 and an index generating unit 602.

The reuse determining unit 601 combines a reference number of List 1 with a reference number of List 0 and determines whether to reuse the WP parameter information of List 0 as the WP parameter information of List 1. In a case where the same reference image is included in the two reference lists, and the values of corresponding WP parameter information are the same, when the same information is encoded not only in List 0 but also in List 1, the code amount increases. Accordingly, the reuse determining unit 601 reuses the WP parameter information of List 0.

More specifically, in a case where the WP parameter information of List 0 is reused, the reuse determining unit 601 sets the reuse flag to "1" and set the reference number of a reference destination (List 0) as reference information. On the other hand, in a case where the WP parameter information of List 0 is not reused, the reuse determining unit 601 sets the reuse flag to "0" and sets WP parameter information corresponding to the reference number of List 1 in the syntax.

The reuse determining unit 601, for example, in accordance with a pseudo code represented in Numerical Expression (11), determines whether or not to reuse the WP parameter information of List 0 as the WP parameter information of List 1.

```
for (refIdx = 0; refIdx <= num_of_active_ref_l1_minus1;
refIdx++){
refPOC = RefPicOrderCnt(ListL1, refIdx)
refWP = RefWPTable(ListL1, refIdx)
reuse_wp_flag = false;
reuse_ref_idx = 0;
for (currIdx = 0; currIdx <= num_of_active_ref_l0_minus1;
currIdx++){
if( refPOC == RefPicOrderCnt(ListL0, currIdx)
&& RefWPTable(ListL0, currIdx, refWP) ){
reuse_wp_flag = true;
reuse_ref_idx = currIdx;
}
}
}                                                          (11)
```

Here, ListL0 represents List 0, and ListL1 represents List 1. RefWPTable( ) is a function for returning whether or not an input reference WP parameter matches a WP parameter corresponding to a list number and a reference number, which have been input, as a flag when the list number, the reference number, and the reference WP parameter are input. In a case where the value of the flag is "1", it represents that both the WP parameters match each other. In the pseudo code represented in Numerical Expression (11), in a case where the reference numbers of List 1 are sequentially scanned, and there are reference images having the same POC number within List 0, when the WP parameters are the same, reuse_wp_flag representing a reuse flag is set to ture, and a reference number corresponding to List 0 is set to reuse_ref_idx.

The reuse determining unit 601 outputs the WP parameter information after the reuse determination so as to be input to the index generating unit 602.

The index generating unit 602 receives the WP parameter information after the reuse determination from the reuse determining unit 601 and maps the WP parameter information after the reuse into a syntax element to be described later, thereby generating index information. The syntax element into which the WP parameter information is mapped by the index generating unit 602 is different from that of the first embodiment. The index generating unit 602 outputs the index information so as to be input to the encoding unit 110.

Figure 26:
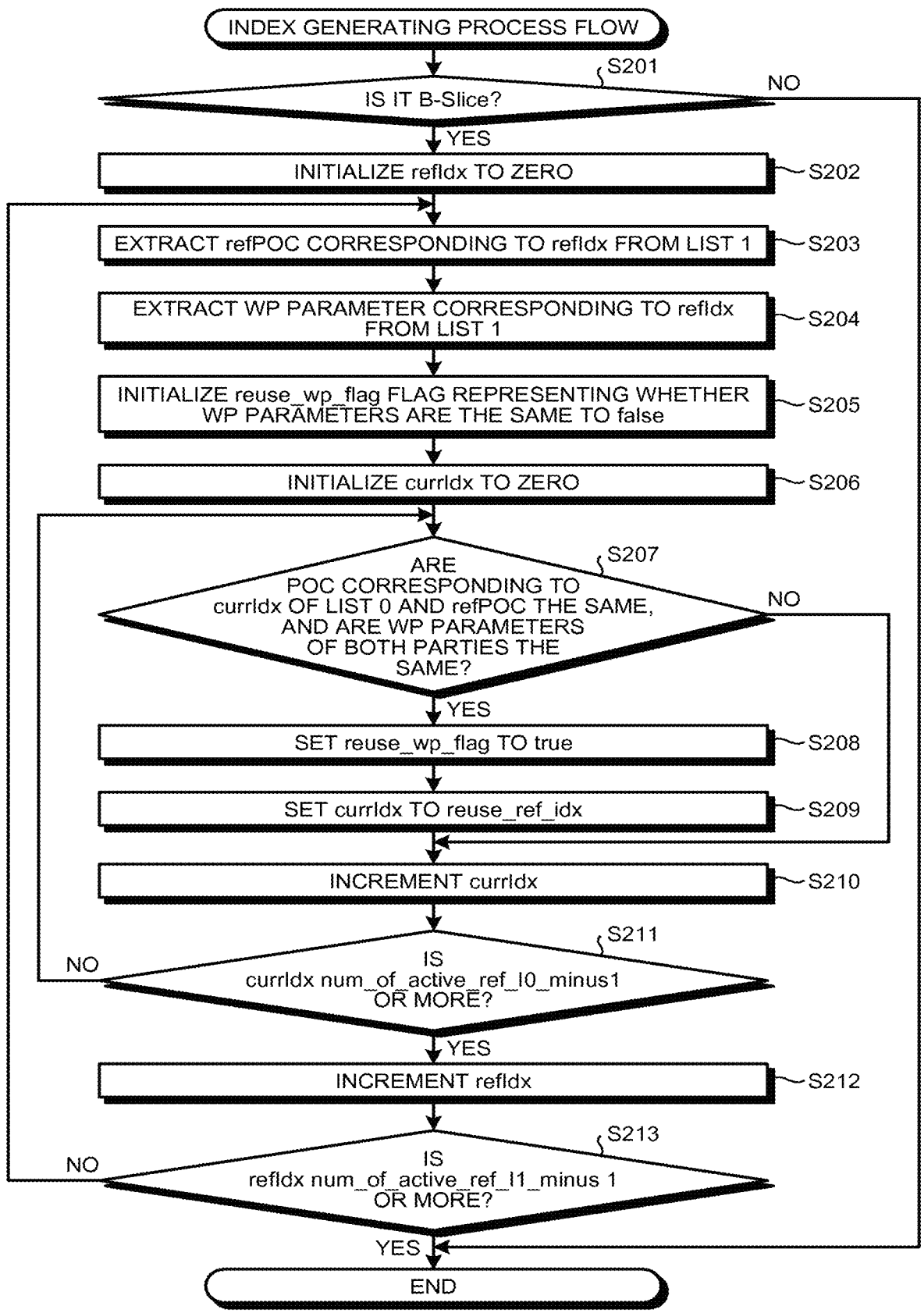
FIG. 26 is a flowchart that illustrates an example of the process of generating index information according to the second embodiment.

FIG. 26 is a flowchart that illustrates an example of the process of generating index information that is performed by the index setting unit 608 according to the second embodiment.

When the WP parameter information is input, the reuse determining unit 601 branches the process based on the slice type (Step S201).

In a case where the slice type is a single-directional prediction slice (P-slice) using only one reference list (No in Step S201), the reuse determining unit 601 directly outputs the WP parameter information illustrated in FIG. 9A to the index generating unit 602. The index generating unit 602 generates index information by mapping the WP parameter information input from the reuse determining unit 601 into a predetermined syntax element to be described later and outputs the generated index information.

On the other hand, in a case where the slice type is a bi-directional prediction slice (B-slice) using two reference lists (Yes in Step S201), the reuse determining unit 601 initializes a variable refIdc to zero (Step S202). The variable refIdc represents a reference number of List 1.

Subsequently, the reuse determining unit 601 derives a variable refPOC representing a POC number of a reference image corresponding to the reference number represented by the variable refIdx (Step S203) and derives a WP parameter corresponding to a reference number represented by the variable refIdx (Step S204).

Subsequently, the reuse determining unit 601 sets a flag reuse_wp_flag to false (Step S205) and sets a variable currIdx to "0" (Step S206). The flag reuse_wp_flag represents whether the WP parameters of Lists 0 and 1 are the same. In addition, the variable currIdx represents a reference number of List 0.

Subsequently, the reuse determining unit 601 determines whether a POC number represented by the derived variable refPOC and a POC number of a reference image corresponding to the reference number represented by the variable currIdx are the same, and a WP parameter corresponding to the reference number represented by the variable refIdx and a WP parameter corresponding to the reference number represented by the variable currIdx are the same (Step S207).

In a case where both the POC numbers and both the WP parameters are the same (Yes in Step S207), the reuse determining unit 601 sets a flag reuse_wp_flag to true (Step S208) and substitutes the value of the variable currIdx into the variable reuse_ref_idx (Step S209). On the other hand, in a case where both POC numbers or both the WP parameters are not the same (No in Step S207), the process of Steps S208 and S209 is not performed. In addition, a configuration may be employed in which the matching of the POC numbers is not checked.

Subsequently, the reuse determining unit 601 increments the variable currIdx (Step S210).

Subsequently, the reuse determining unit 601 determines whether the value of the variable currIdx is num_of_active_ref_l0_minus1, which is a value acquired by subtracting one from a maximum number of List 0, or more (Step S211). In a case where the value of the variable currIdx is num_of_active_ref_l0_minus1 or less (No in Step S211), the process of Steps S207 to S210 is repeated.

On the other hand, in a case where the value of the variable currIdx is larger than num_of_active_ref_l0_minus1 (Yes in Step S211), the reuse determining unit 601 completes the checking of List 0 and increments the variable refIdx (Step S212).

Subsequently, the reuse determining unit 601 determines whether the value of the variable refIdx is num_of_active_ref_l1_minus1, which is a value acquired by subtracting one from a maximum number of List 1, or more (Step S213). In a case where the value of the variable refIdx is num_of_active_ref_l1_minus1 or less (No in Step S213), the process of Steps S203 to S212 is repeated.

On the other hand, in a case where the value of the variable refIdx is larger than num_of_active_ref_l1_minus1 (Yes in Step S213), the reuse determining unit 601 completes the checking of List 11 and outputs the WP parameter information after the reuse determination to the index generating unit 602. The index generating unit 602 generates index information by mapping the WP parameter information input from the reuse determining unit 601 into a predetermined syntax element to be described later and outputs the generated index information.

FIG. 27 is a diagram that illustrates an example of the pred weight table syntax 506 according to the second embodiment. In syntax elements illustrated in FIG. 27, symbols of l0 and l1 correspond to Lists 0 and 1, respectively. In addition, a syntax element having the same prefix as that illustrated in FIG. 21 is used as the same variable except for different treatment of a reference list although there is a difference of List 0 or List 1 but not of common list. For example, luma_weight_l0[$i$] is a syntax element representing a weighting factor of the i-th reference number in the reference list l0.

luma_log2_weight_denom and chroma_log2_weight_denom have the same configuration as that of the first embodiment. First, for List 0 in which a symbol of l0 is included, luma_weight_l0_flag, luma_weight_l0[$i$], luma_offset_l0[$i$], chroma_weight_l0_flag, chroma_weight_l0[$i$][$j$], and chroma_offset_l0[$i$][$j$] are defined. Next, syntax elements for List 1 in which a symbol of l1 is included are defined.

Here, reuse_wp_flag is a syntax element representing whether or not a WP parameter of l0 corresponding to List 0 is reused. In a case where reuse_wp_flag is "1", the weighing factor and the offset are not encoded, but reuse_ref_idx is encoded. reuse_ref_idx represents a reference number of l0 corresponding to List 0 to which the WP parameter corresponds that is used. For example, in a case where reuse_ref_idx is "1", a WP parameter corresponding to a reference number "1" of List 0 is copied to a WP parameter corresponding to the reference number i of List 1. On the other hand, in a case where reuse_wp_flag is "0", similarly to List 0, luma_weight_l1_flag, luma_weight_l1[i], luma_offset_l1[i], chroma_weight_l1_flag, chroma_weight_l1[i][j], and chroma_offset_l1[i][j] are encoded.

As above, according to the second embodiment, in a case where there is a combination including the same reference image in two reference lists of Lists 0 and 1 in the WP parameter information, the index setting unit 608 removes a redundant WP parameter that is duplicate in the WP parameter information and generates index information by reusing the duplicate WP parameter. Therefore, according to the second embodiment, the code amount of the index information can be reduced.

According to the second embodiment, WP parameter information corresponding to List 0 is encoded in a conventional manner, and, in order to encode the WP parameter information corresponding to List 1, it is checked whether the same reference image is to be referred to inside List 0. In addition, the same reference image is referred to, and, in a case where the WP parameters are the same as well, information representing a reference number of List 0 to which the WP parameter corresponds is encoded together with encoding the flag for reusing the WP parameter of List 0. The amount of such information is markedly smaller than that of information relating to the weighting factor and the offset, and accordingly, the code amount of the WP parameter information can be configured to be much smaller than that of a case where Lists 0 and 1 are separately encoded.

In addition, according to the second embodiment, in a case where the reference numbers included in Lists 0 and 1 represent the same reference image, and the WP parameters are different from each other, WP parameters different from each other can be set. In other words, in a case where there is a combination representing the same reference image within reference lists, the same WP parameters are forcibly set in the first embodiment, and, a redundant representation of the same WP parameters is removed only in a case where the WP parameters are the same in the second embodiment.

Third Embodiment

Figure 28:
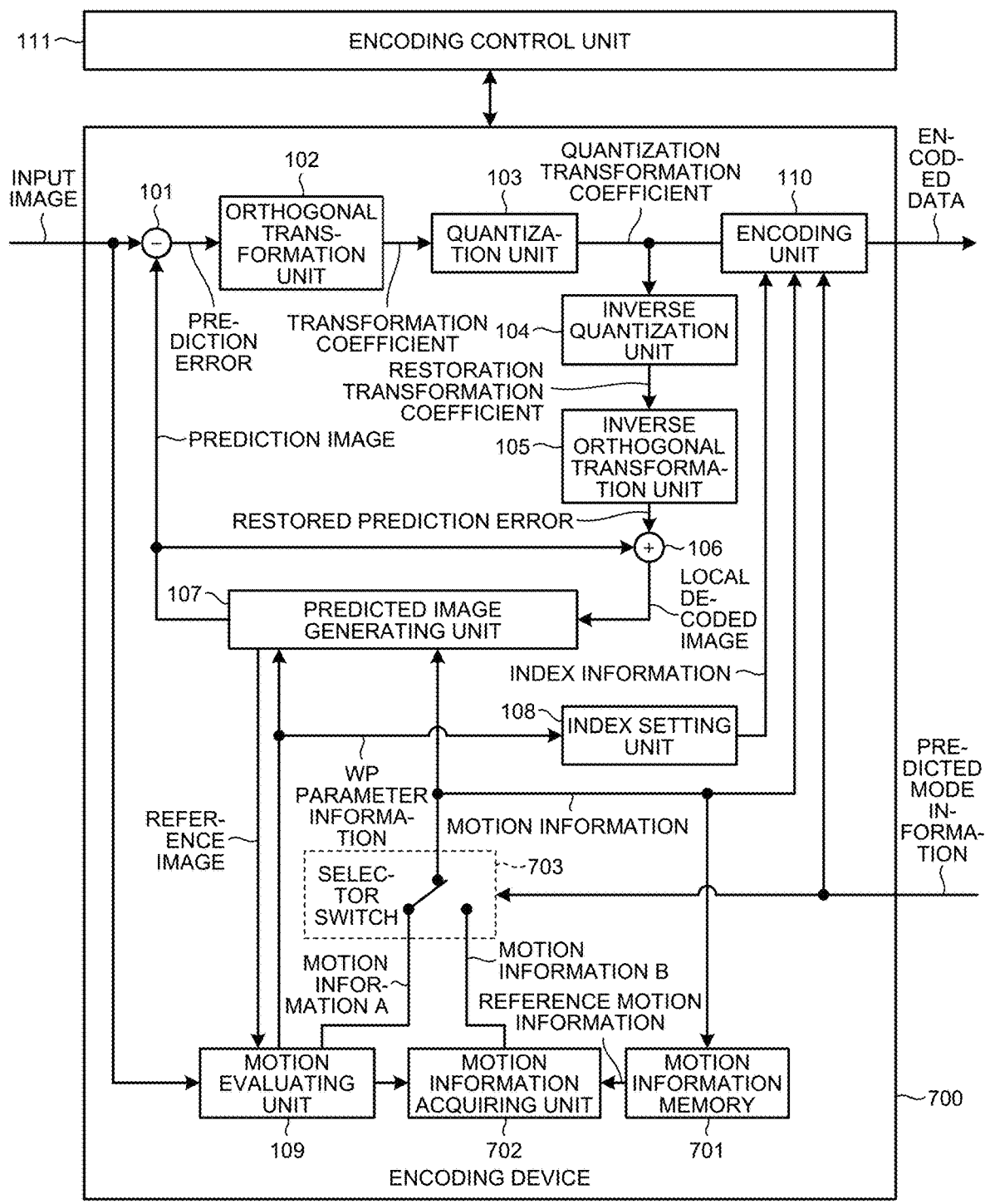
FIG. 28 is a block diagram that illustrates an example of the configuration of an encoding device according to a third embodiment.

A third embodiment will be described. FIG. 28 is a block diagram that illustrates an example of the configuration of an encoding device 700 according to the third embodiment. The encoding device 700 according to the third embodiment further includes a motion information memory 701, a motion information acquiring unit 702, and a selector switch 703, which is different from the encoding device 100 according to the first embodiment. Hereinafter, differences from the first embodiment will be mainly described, the same name/reference numeral will be assigned to each constituent element having the same function as that of the first embodiment, and the description thereof will not be presented.

The motion information memory 701 temporarily stores motion information applied to a pixel block that has been encoded as reference motion information. The motion information memory 701 may reduce the amount of information by performing a compression process such as sub-sampling for the motion information.

Figure 29:
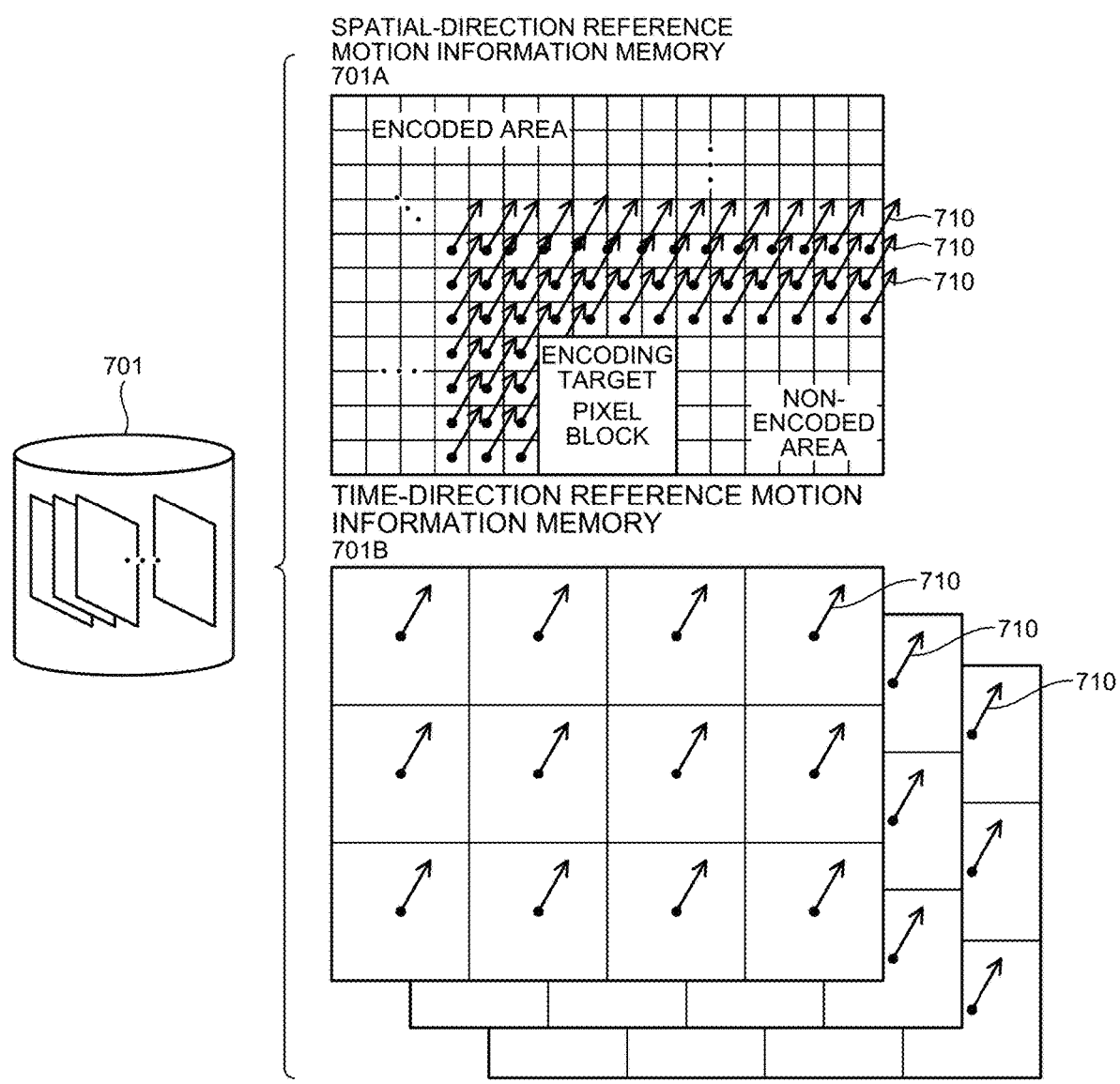
FIG. 29 is a diagram that illustrates a detailed example of motion information memory according to the third embodiment.

FIG. 29 is a diagram that illustrates a detailed example of the motion information memory 701 according to the third embodiment. The motion information memory 701, as illustrated in FIG. 29, is maintained in units of frames or slices and further includes a spatial-directional reference motion information memory 701A that stores motion information on a same frame as reference motion information 710 and a time-directional reference motion information memory 701B storing motion information of a frame that has been encoded as reference motion information 710. A plurality of time-directional reference motion information memories 701B may be arranged in accordance with the number of reference frames used by the encoding target frame for a prediction.

The reference motion information 710 is maintained in the spatial-directional reference motion information memory 701A and the time-directional reference motion information memory 701B in units of predetermined areas (for example, in units of 4×4 pixel blocks). The reference motion information 710 further includes information representing whether the area is encoded by an inter-prediction to be described later or is encoded by an intra-prediction to be described later. In addition, also in a case where a pixel block (a coding unit or a prediction unit) is inter-predicted using motion information predicted from an encoded area without the value of a motion vector included in the motion information being encoded as in a skip mode or a direct mode defined in H.264 or a merge mode to be described later, the motion information of the pixel block is maintained as the reference motion information 710.

When the encoding process for the encoding target frame or the encoding target slice is completed, the spatial-directional reference motion information memory 701A of the frame is changed to be treated as the time-directional reference motion information memory 701B used for a frame to be encoded next. At this time, in order to reduce the capacity of the time-directional reference motion information memory 701B, it may be configured such that the motion information is compressed, and the compressed motion information is stored in the time-directional reference motion information memory 701B.

The motion information acquiring unit 702 receives reference motion information from the motion information memory 701 as input and outputs motion information B used for an encoding pixel block. Details of the motion information acquiring unit 702 will be described later.

The selector switch 703 selects one of the motion information B output from the motion information acquiring unit 702 and motion information A output from the motion evaluating unit 109 in accordance with prediction mode information to be described later and outputs the selected motion information to the predicted image generating unit 107 as motion information. The motion information A output from the motion evaluating unit 109 is used for encoding information of a difference from a predicted motion vector acquired from a predicted motion vector acquiring unit not illustrated in the figure and predicted motion vector acquiring position information. Hereinafter, such a prediction mode will be referred to as an inter-mode. On the other hand, the motion information B output from the motion information acquiring unit 702 in accordance with prediction mode information is used for merging motion information from adjacent pixel blocks and is directly applied to an encoding pixel block, and accordingly, other information (for example, motion vector difference information) relating to the motion information does not need to be encoded. Hereinafter, such a prediction mode will be referred to as a merge mode.

The prediction mode information is in accordance with a prediction mode that is controlled by the encoding control unit 111 and includes switching information of the selector switch 703.

Hereinafter, details of the motion information acquiring unit 702 will be described.

Figure 30A:
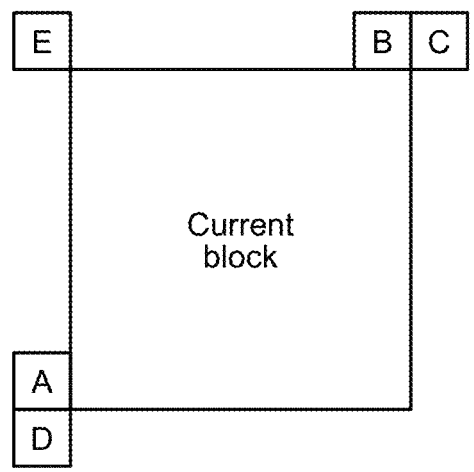
FIG. 30A is a diagram that illustrates an example of block positions at which motion information candidates are derived for an encoding pixel block according to the third embodiment.
Figure 30B:
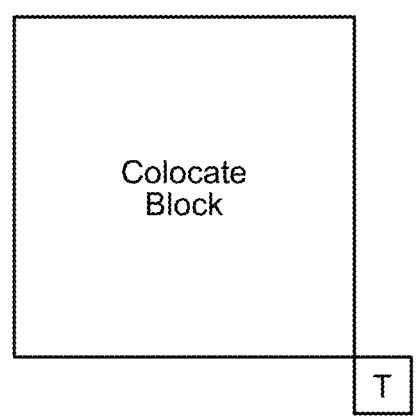
FIG. 30B is a diagram that illustrates an example of a block position at which a motion information candidate is derived for an encoding pixel block according to the third embodiment.

The motion information acquiring unit 702 receives the reference motion information as an input and outputs the motion information B to the selector switch 703. FIGS. 30A and 30B are diagrams that illustrate an example of block positions at which motion information candidates are derived for an encoding pixel block according to the third embodiment. In FIG. 30A, A to E represent pixel blocks, which are spatially adjacent to the encoding pixel block, used for deriving motion information candidates. In addition, in FIG. 30B, T represents a pixel block, which is adjacent in time, used for deriving a motion information candidate.

FIG. 31 is a diagram that illustrates an example of the relation between pixel block positions of a plurality of motion information candidates and pixel block position indices (idx) according to the third embodiment. The block positions of the motion information candidates are arranged in order of spatially-adjacent block positions A to E and the pixel block position T that is adjacent in time, and, in a case where there is an available (an inter-prediction is applied) pixel block in the order, indices idx are sequentially assigned thereto until the maximum number (N−1) of the motion information stored in the storage list MergeCandList of the merge mode is reached.

Figure 32:
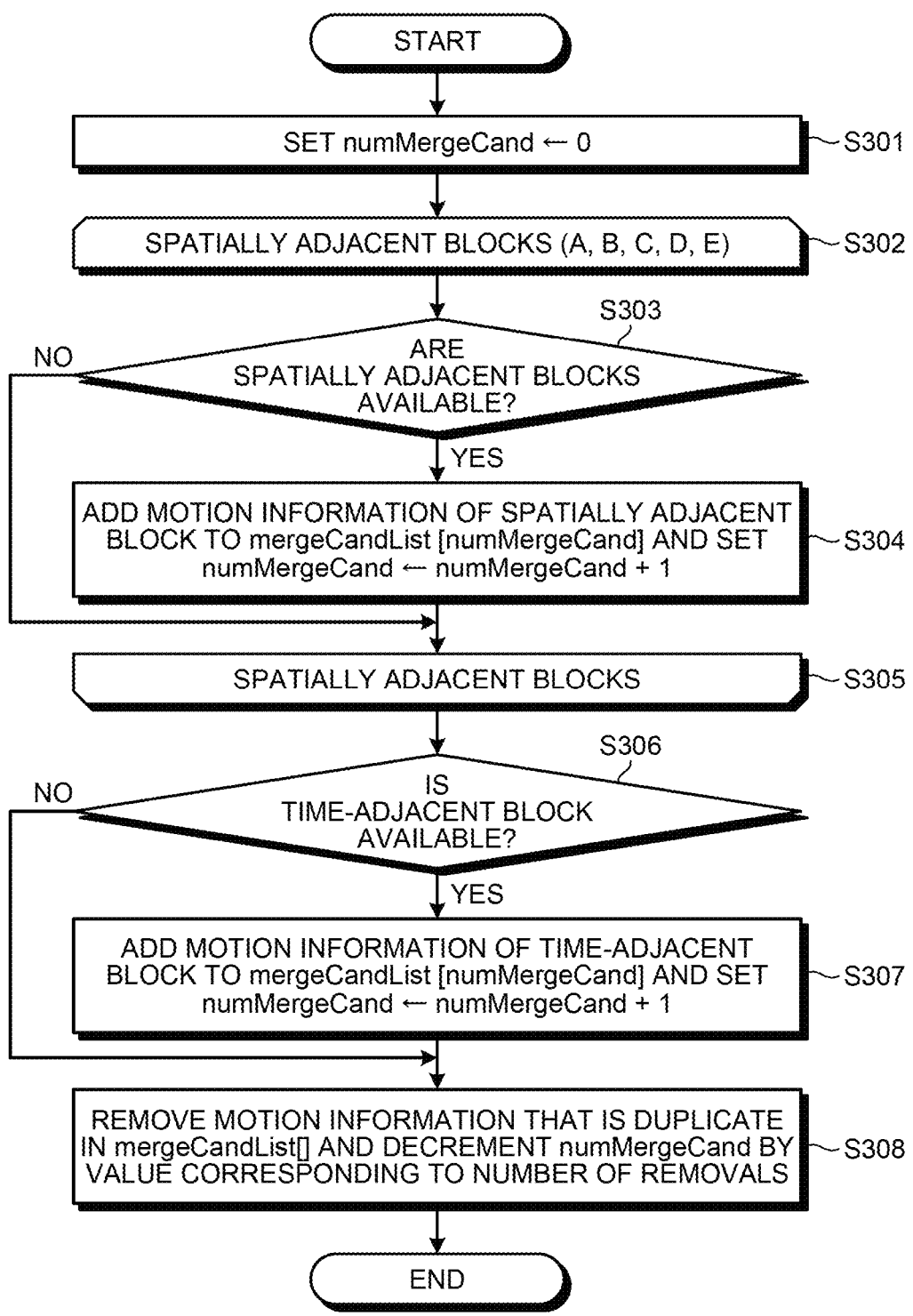
FIG. 32 is a flowchart that illustrates an example of a storage process for MergeCandList according to the third embodiment.

FIG. 32 is a flowchart that illustrates an example of a storage process for MergeCandList according to the third embodiment.

First, the motion information acquiring unit 702 initializes the storage number numMergeCand for MergeCandList to "0" (Step S301).

Subsequently, the motion information acquiring unit 702 determines whether or not all the spatially-adjacent blocks (for example, blocks A to E) are available (Steps 5302 and S303). In a case where all the spatially-adjacent blocks are available (Yes in Step S303), the motion information acquiring unit 702 stores the motion information of the spatially-adjacent blocks in MergeCandList and increment numMergeCand (Step S304). On the other hand, in a case where all the spatially-adjacent blocks are not available (No in Step S303), the motion information acquiring unit 702 does not perform the process of Step S304.

When the process of Steps S303 and S304 is performed for all the spatially-adjacent blocks (Step S305), the motion information acquiring unit 702 determines whether a block (for example, the block T) that is adjacent in time is available (Step S306).

In a case where the block that is adjacent in time is available (Yes in Step S306), the motion information acquiring unit 702 stores the motion information of the block T that is adjacent in time in MergeCandList and increment numMergeCand (Step S307). On the other hand, in a case where the block that is adjacent in time is not available (No in Step S306), the motion information acquiring unit 702 does not perform the process of Step S307.

Subsequently, the motion information acquiring unit 702 removes duplicate motion information within MergeCandList and decreases numMergeCand by a value corresponding to the number of removals (Step S308). In order to determine whether or not the motion information is duplicate within MergeCandList, the motion information acquiring unit 702 determines whether or not two types of motion information (a motion vector mv and a reference number refIdx) and WP parameter information within MergeCandList match each other and removes one side from MergeCandList[ ] in a case where all the information match each other FIG. 33 is a diagram that illustrates an example of a storage list of motion information according to the third embodiment and, described in detail, illustrates an example of a storage list MergeCandList[idx] of motion information (a motion vector mv and a reference number refIdx) corresponding to each idx in accordance with the table illustrated in FIG. 31 with N=5. In FIG. 33, in a storage list of idx=0, reference motion information (a motion vector mv0L0, a reference number refIdx0L0) of List 0 is stored, in a storage list of idx=1, reference motion information (a motion vector mv1L1, a reference number refIdx1L1) of List 1 is stored, and, in storage lists of idx=2 to 4, reference motion information (motion vectors mv2L0 and mv2L1, reference numbers refIdx2L0 and refIdx2L1) of both Lists 0 and 1 are stored.

The encoding pixel block selects one of a maximum N kinds of indices idx, derives reference motion information of a pixel block corresponding to the selected index idx from MergeCandList[idx], and outputs the derived reference information as motion information B. In a case where there is no reference motion information, the encoding pixel block outputs motion information having a zero vector as a predicted motion information candidate B. The information (a syntax merge_idx to be described later) of the selected index idx is included in the predicted mode information and is encoded by the encoding unit 110.

In addition, blocks that are adjacent in space or time are not limited to those illustrated in FIGS. 30A and 30B, and the adjacent block may be located at any position within an area that has been encoded. Furthermore, as another example of the above-described list, the maximum storage number (N) for MergeCandList and the storage order for MergeCandList are not limited to the above-described ranges, and arbitrary order or an arbitrary maximum number may be used.

In a case where the encoded slice is a B slice, and the maximum storage number N has not been arrived even in a case where the reference motion information of the pixel blocks that are adjacent in time or space is stored in MergeCandList[ ], the motion information of List 0 and the motion information of List 1 stored in MergeCandList[ ] at that time point are combined so as to newly generate a bi-directional prediction, and the generated bi-directional prediction is stored in MergeCandList[ ].

Figure 34:
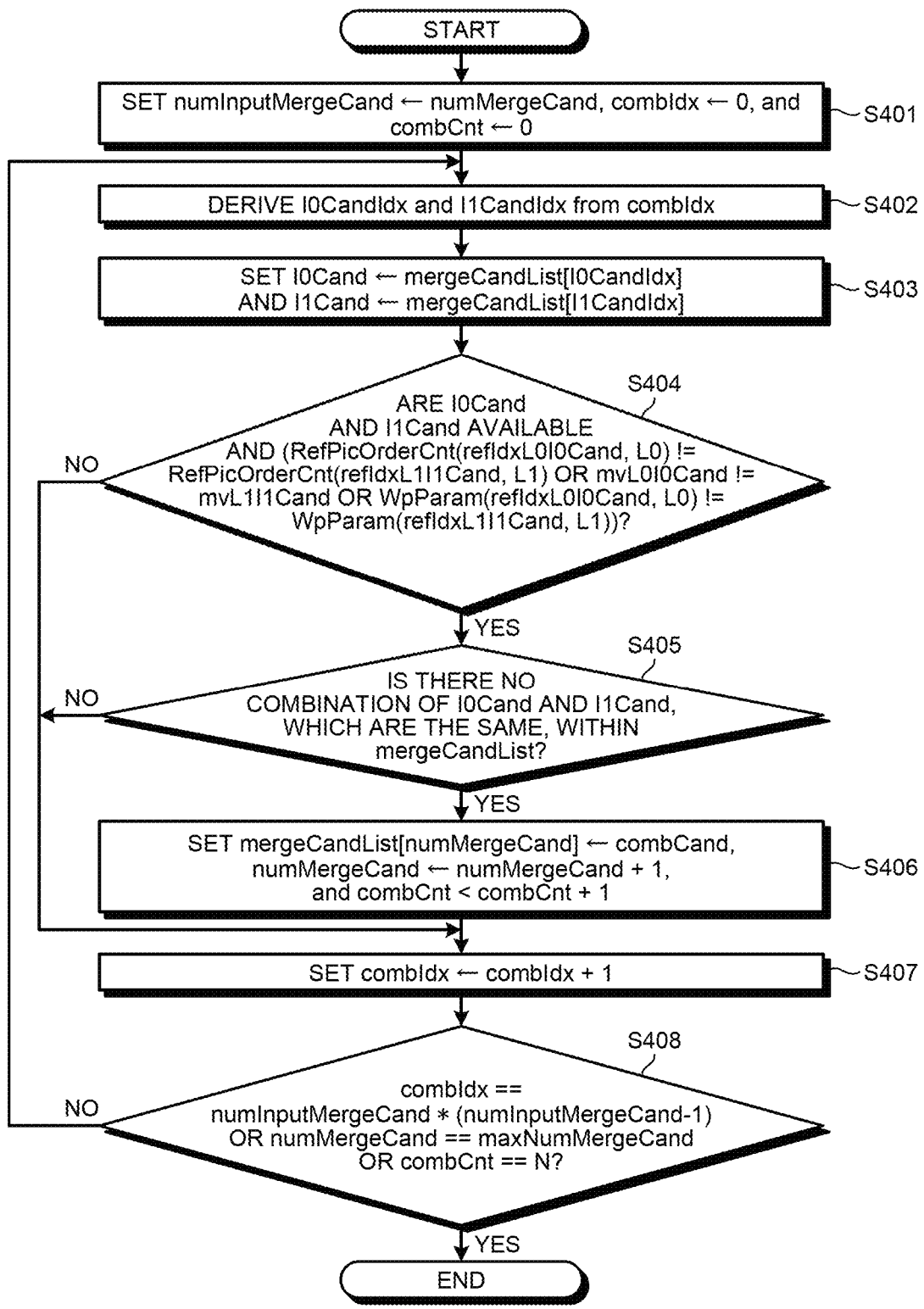
FIG. 34 is a flowchart that illustrates an example of a method of storing motion information in the storage list according to the third embodiment.

FIG. 34 is a flowchart that illustrates an example of a method of storing motion information in the storage list according to the third embodiment.

First, the motion information acquiring unit 702 sets the storage number from pixel blocks adjacent in time or space to MergeCandList to numInputMergeCand, initializes a variable numMergeCand representing the current storage number to numInputMergeCand, and initializes variables combIdx and combCnt to zero (Step S401).

Subsequently, the motion information acquiring unit 702 derives variables l0CandIdx and l1CandIdx from combIdx using a newly generated combination (see FIG. 35) of bi-directional predictions (Step S402). In addition, the combinations for deriving the variables l0CandIdx and l1CandIdx from the variable combIdx are not limited to the example illustrated in FIG. 36 but may be arranged in arbitrary order unless they are duplicate.

Subsequently, the motion information acquiring unit 702 sets the reference motion information (two types of Lists 0 and 1 in the case of a bi-directional prediction) stored in MergeCandList[l0CandIdx] to l0Cand. A reference number at motion information of l0Cand will be referred to as refIdxL0l0Cand, and a motion vector at the motion information of l0Cand will be referred to as mvL0/0Cand. Similarly, the motion information acquiring unit 702 sets the reference motion information stored in MergeCandList [l1CandIdx] to l1Cand. A reference number at reference motion information of l1Cand will be referred to as refIdxL1/1Cand, and a motion vector at the reference motion information of l1Cand will be referred to as mvL1/1Cand (Step S403). In addition, a combination of motion information for making a bi-directional prediction using l0Cand as the motion information of List 0 and L1Cand as the motion information of List 1 will be referred to as combCand.

Subsequently, the motion information acquiring unit 702 determines whether or not blocks referred to by l0Cand and l1Cand are the same using Conditional Equations (12) to (15) (Step S404).

Are l0Cand and l1Cand available? (12)

RefPicOrderCnt(refIdxL0l0Cand,L0) !=RefPicOrder-Cnt(refIdxL1l1Cand, L1) (13)

mvL0l0Cand !=mvL1l1Cand (14)

WpParam(refIdxL0l0Cand,L0) !=WpParam(refIdxL1l1Cand, L1) (15)

RefPicOrderCnt(refIdx, LX) is a function for deriving a POC (Picture Order Count) of a reference frame corresponding to the reference number refIdx in reference list X (here, X=0 or 1). In addition, WpParam(refIdx, LX) is a function for deriving WP parameter information of a reference frame corresponding to the reference number refIdx in reference list X (here, X=0 or 1). This function returns "Yes" in a case where reference frames of List 0 and 1 do not have the same WP parameters (presence/no presence of WP WP_flag, a weighting factor Weight, and an offset Offset) and returns "No" in a case where the reference frames have totally same parameters. As another example of WpParam( ), the determination may be made using only a part of the data of WP parameters as in a case where only the matching of the presence/no-presence of WP WP-flag and the offsets Offset are checked without checking the matching of all the parameters or the like.

In a case where Conditional Equation (12) is satisfied, and one of Conditional Equations (13) to (15) is satisfied (Yes in Step S404), the motion information acquiring unit 702 determines whether or not there is a bi-directional prediction using the same combination as that of l0Cand and l1Cand within mergeCandList[ ] (Step S405).

In a case where there is the same combination as that of l0Cand and l1Cand within mergeCandList[ ] (Yes in Step S405), the motion information acquiring unit 702 adds combCand to the rearmost end of mergeCandList (Step S406). More specifically, the motion information acquiring unit 702 substitutes combCand into mergeCandList[numMergeCand] and increments numMergeCand and combCnt.

Subsequently, the motion information acquiring unit 702 increments combIdx (Step S407).

Subsequently, the motion information acquiring unit 702 determines whether to complete storage for mergeCandList [ ] by using Conditional Equations (16) to (18) (Step S408).

combIdx==numInputMergeCand*(numInputMergeCand?1)) (16)

numMergeCand==maxNumMergeCand (17)

combCnt==N (18)

In a case where one of Conditional Equations (16) to (18) is satisfied (Yes in Step S408), the process ends. On the other hand, in a case where all the Conditional Equations (16) to (18) are satisfied (No in Step S408), the process is returned to Step S402.

The process of a case where the encoding slice is a B slice, and the maximum storage number N has not been reached even when the reference motion information of pixel block that are adjacent in space or time is stored in MergeCandList[ ] has been described. As above, the motion information B is output from the motion information acquiring unit 702 to the selector switch 703.

FIG. 36 is a diagram that illustrates an example of a pred unit syntax 512 according to the third embodiment. skip_flag is a flag representing whether or not a prediction mode of a coding unit to which a prediction unit syntax belongs is a skip mode. In a case where skip_flag is "1", it represents that syntaxes (the coding unit syntax, the prediction unit syntax, and the transform unit syntax) other than the prediction mode information are not encoded. On the other hand, in a case where skip_flag is "0", it represents that the prediction mode of a coding unit to which the prediction unit syntax belongs is not a skip mode.

Next, merge_flag that is a flag representing whether or not the encoding pixel block (prediction unit) is in the merge mode is encoded. In a case where the value of Merge_flag is "1", it represents that the prediction unit is in the merge mode. On the other hand, in a case where the value is "0", it represents that the prediction unit uses an inter-mode. In the case of Merge_flag, merge_idx that is information used for specifying the pixel block position index (idx) described above is encoded.

In a case where Merge_flag is "1", prediction unit syntaxes other than merge_flag and merge_idx do not need to be encoded. On the other hand, in a case where Merge_flag is "0", it represents that the prediction unit is the inter-mode.

As above, according to the third embodiment, in simultaneously applying the weighted motion compensation and the merge mode, the encoding device 700 solves the problem in which reference motion information of pixel blocks adjacent in space or time is removed from MergeCandList even in a case where motion vectors and reference numbers match each other and WP parameter information is different from each other when the motion information that is duplicate within the storage list MergeCandList of the merge mode is removed. In addition, in a case where the maximum storage number N has not been reached even when the reference motion information is stored in MergeCandList, a problem is solved in which two types of motion information used for a bi-directional prediction refer to the same block when motion information of Lists 0 and 1 stored in MergeCandList at that time point is combined together, and a bi-directional prediction is newly generated and is stored in MergeCandList[ ].

In a case where two types of motion information used for a bi-directional prediction refer to the same block, a predicted value according to a bi-directional prediction and a predicted value according to a single-directional prediction match each other. Generally, the efficiency of the bi-directional prediction is higher than the efficiency of the single-directional prediction, and accordingly, it is preferable that the two types of motion information used for a bi-directional prediction do not refer to the same block. When it is determined whether or not the two types of motion information used for a bi-directional prediction refer to the same block, in addition to the reference frame number position (POC) derived from a reference number, a parameter of the weighted motion compensation is introduced to the determination item. Accordingly, even when the reference frame number position (POC) is the same as of the motion vector, the encoding device 700 determines that two types of motion information having mutually-different parameters of the weighted motion compensation do not refer to the same block, and the prediction efficiency of the motion information used for the bidirectional prediction stored in the storage list of the merge mode can be improved.

In addition, as another example of the storage process for MergeCandList, it may be configured such that it is determined whether or not the WP parameter of the reference frame of a block T that is adjacent in time and the WP parameter of the reference frame of the encoding pixel block match each other when the motion information of the block T that is adjacent in time is stored in MergeCandList, and the motion information is stored in MergeCandList only in a case where the WP parameters match each other. The reason for this that, in a case where the WP parameter of the reference frame of the block T that is adjacent in time and the WP parameter of the reference frame of the encoding pixel block are different from each other, it can be estimated that the correlation between the motion information of the block T that is adjacent in time and the motion information of the encoding pixel block is lowered.

Figure 37:
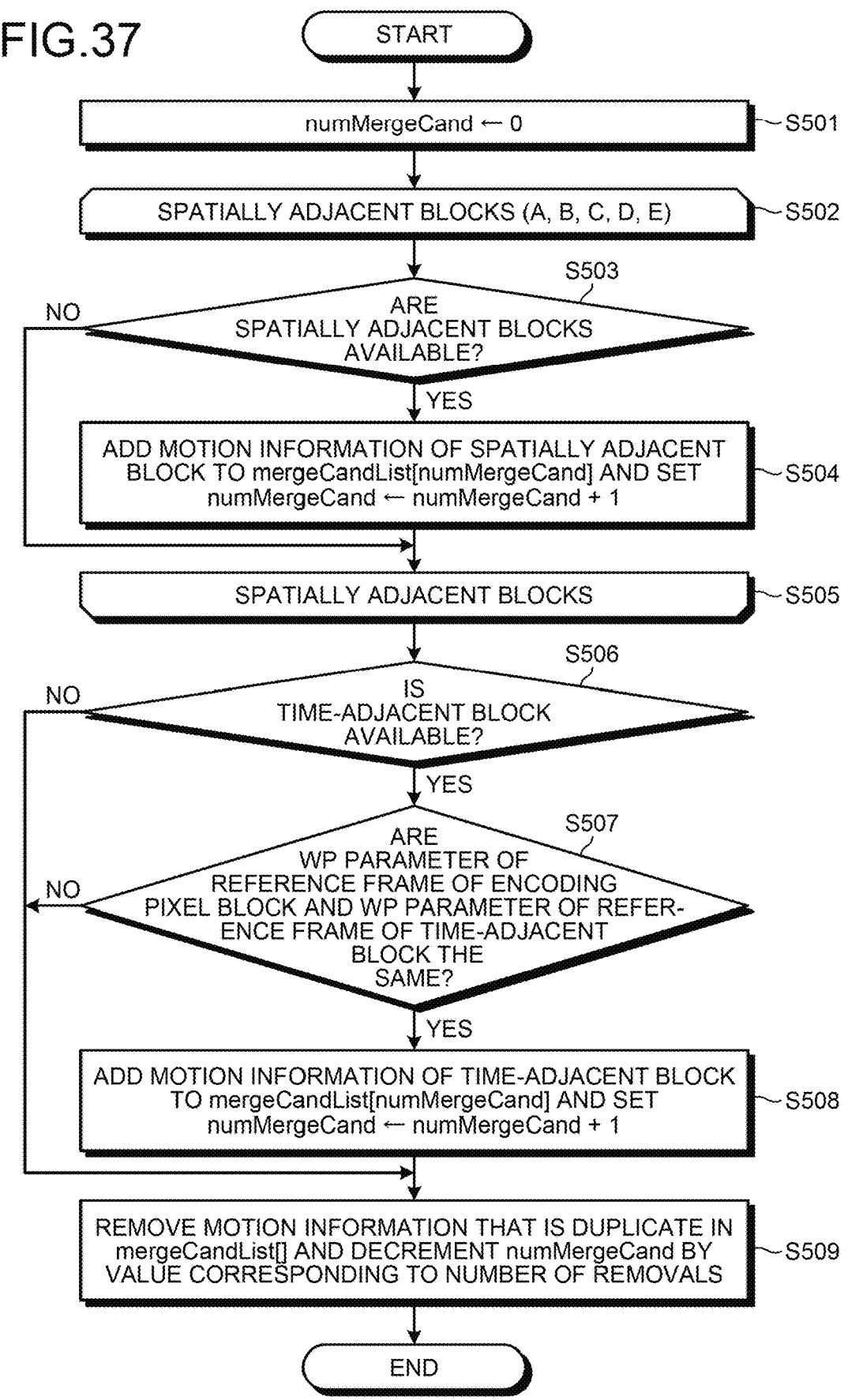
FIG. 37 is a flowchart that illustrates another example of the storage process for MergeCandList according to the third embodiment.
Figure 38:
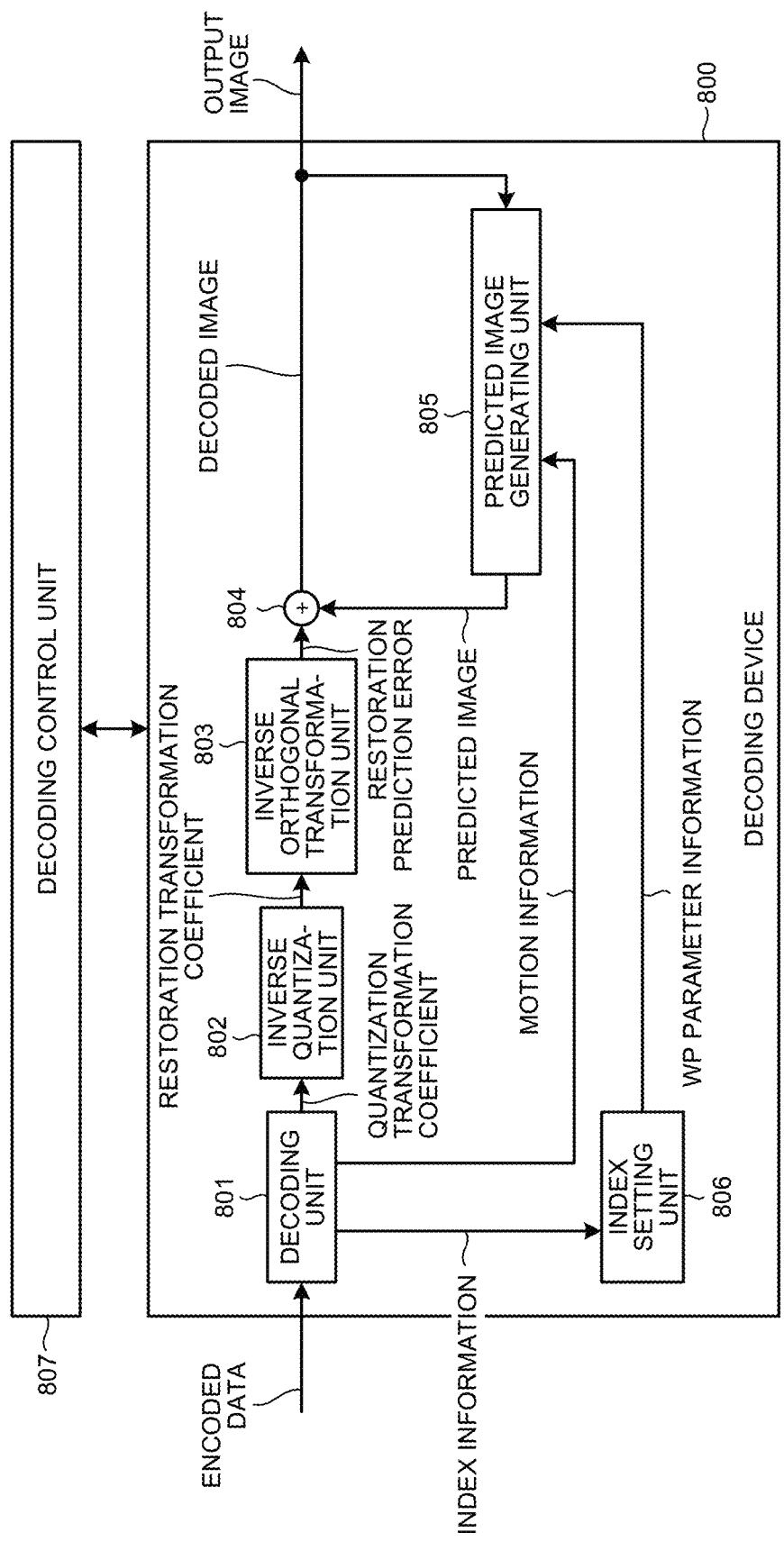
FIG. 38 is a block diagram that illustrates an example of the configuration of a decoding device according to a fourth embodiment.

FIG. 37 is a flowchart that illustrates another example of the storage process for MergeCandList according to the third embodiment. The flowchart illustrated in FIG. 38 is the same as that illustrated in FIG. 32 except for Step S507.

In addition, as a further another example, in a case where WP parameter of the reference frame of the block T that is adjacent in time and the WP parameter of the reference frame of the encoding pixel block are different from each other, a block having the same WP parameter in the reference frame of the encoding pixel block out of blocks adjacent to the block T in space may be replaced with the block T. At this time, the correlation between the motion information of the block T that is adjacent in time and the motion information of the encoding pixel block is not lowered.

Fourth Embodiment

In a fourth embodiment, a decoding device that decodes encoded data encoded by the encoding device according to the first embodiment will be described.

FIG. 38 is a block diagram that illustrates an example of the configuration of the decoding device 800 according to the fourth embodiment.

The decoding device 800 decodes encoded data stored in an input buffer not illustrated in the figure or the like into a decoded image and outputs the decoded image to an output buffer not illustrated in the figure as an output image. The encoded data, for example, is output from the encoding device 100 illustrated in FIG. 1 or the like and is input to the decoding device 800 through a storage system, a transmission system, a buffer, or the like not illustrated in the figure.

The decoding device 800, as illustrated in FIG. 38, includes: a decoding unit 801, an inverse quantization unit 802; an inverse orthogonal transformation unit 803; an addition unit 804; a predicted image generating unit 805; and an index setting unit 806. The inverse quantization unit 802, the inverse orthogonal transformation unit 803, the addition unit 804, and the predicted image generating unit 805 are elements that are substantially the same as or similar to the inverse quantization unit 104, the inverse orthogonal transformation unit 105, the addition unit 106, and the predicted image generating unit 107 illustrated in FIG. 1, respectively. In addition, a decoding control unit 807 illustrated in FIG. 38 controls the decoding device 800 and, for example, is realized by a CPU or the like.

In order to decode encoded data, the decoding unit 801 performs decoding based on the syntax for each frame or each field. The decoding unit 801 sequentially performs entropy decoding of a code string of each syntax and regenerates motion information including a prediction mode, a motion vector, and a reference number, index information used for a weighted motion compensated prediction, and encoding parameters of an encoding target block such as a quantization transformation coefficient and the like. Here, the encoding parameters are all the parameters that are necessary for decoding information relating to a transformation coefficient, information relating to quantization, and the like in addition to those described above. The decoding unit 801 outputs the motion information, the index information, and the quantization transformation coefficient, so as to input the quantization transformation coefficient to the inverse quantization unit 802, input the index information to the index setting unit 806, and input the motion information to the predicted image generating unit 805.

The inverse quantization unit 802 performs an inverse quantization process for the quantization transformation coefficient input from the decoding unit 801 and acquires a restoration transformation coefficient. More specifically, the inverse quantization unit 802 performs inverse quantization based on the quantization information used by the decoding unit 801. Described in more detail, the inverse quantization unit 802 multiplies the quantization transformation coefficient by a quantization step size derived based on the quantization information, thereby acquiring a restored transformation coefficient. The inverse quantization unit 802 outputs the restored transformation coefficient so as to be input to the inverse orthogonal transformation unit 803.

The inverse orthogonal transformation unit 803 performs an inverse orthogonal transformation corresponding to the orthogonal transformation performed on the encoding side for the restored transformation coefficient input from the inverse quantization unit 802, thereby acquiring a restored prediction error. The inverse orthogonal transformation unit 803 outputs the restored prediction error so as to be input to the addition unit 804.

The addition unit 804 adds the restored prediction error input from the inverse orthogonal transformation unit 803 and a corresponding predicted image, thereby generating a decoded image. The addition unit 804 outputs the decoded image so as to be input to the predicted image generating unit 805. In addition, the addition unit 804 outputs the decoded image to the outside as an output image. Thereafter, the output image is temporarily stored in an external output buffer not illustrated in the figure or the like and is output to a display device system such as a display or a monitor not illustrated in the figure or a video device system, for example, at output timing managed by the decoding control unit 807.

The index setting unit 806 receives the index information input from the decoding unit 801, checks a reference list (list number) and a reference image (reference number), and outputs the WP parameter information so as to be input to the predicted image generating unit 805.

Figure 39:
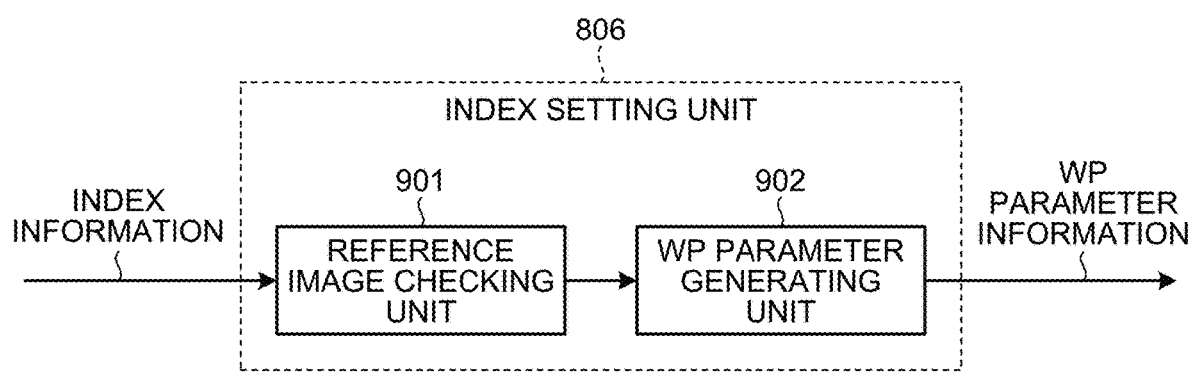
FIG. 39 is a block diagram that illustrates an example of the configuration of an index setting unit according to the fourth embodiment.

FIG. 39 is a block diagram that illustrates an example of the configuration of the index setting unit 806 according to the fourth embodiment. The index setting unit 806, as illustrated in FIG. 39, includes a reference image checking unit 901 and a WP parameter generating unit 902.

The reference image checking unit 901 receives index information from the decoding unit 801 and checks whether or not reference numbers included in two reference lists represent the same reference image.

Here, the reference number included in the reference list, for example, has already been decoded by using a method defined in H.264 or the like. Accordingly, the reference image checking unit 901 can check whether there is a combination representing the same reference image using derived reference lists and reference numbers in accordance with the management of a decoded picture buffer (DPB) defined in H.264 or the like. In addition, for the control of the DPB, a method defined in H.264 or the like may be employed, or any other method may be employed. Here, a reference list and a reference number may be determined in advance based on the control of the DPB.

The reference image checking unit 901 creates a common reference list and checks reference lists and reference numbers in the scanning order illustrated in FIG. 14. Here, the common reference list is created using the pseudo code represented in Numerical Expression (10).

The WP parameter generating unit 902 generates WP parameter information corresponding to a reference list and a reference number from the created common reference list based on the relation between the reference list and the reference number that is checked by the reference image checking unit 901 and outputs the generated WP parameter information so as to be input to the predicted image generating unit 805. The WP parameter information has already been described with reference to FIGS. 9A and 9B, and thus, description thereof will not be presented.

The WP parameter generating unit 902 uses a common_scan_list( ) function and a common_scan_ref_idx( ) function in accordance with the common list, which is scanned to pull a reference list and a reference number through scanning using and supplements the WP parameter information in missing places.

In other words, the common lists illustrated in FIGS. 15 and 16 are restored in FIGS. 11 and 13 respectively and assigns index information corresponding to the common list based on the correspondence to the WP parameter information illustrated in FIGS. 9A and 9B.

In addition, the scanning order illustrated in FIG. 14 is an example, and any other scanning order may be used as long as it is predetermined scanning order. Furthermore, the pseudo code represented in Numerical Expression (10) is an example, a process may be added or a redundant process may be eliminated as long as the purpose of this process can be realized.

Referring back to FIG. 38, the predicted image generating unit 805 generates a predicted image by using the motion information input from the decoding unit 801, the WP parameter information input from the index setting unit 806, and the decoded image input from the addition unit 804.

Here, the predicted image generating unit 805 will be described in detail with reference to FIG. 4. The predicted image generating unit 805, similarly to the predicted image generating unit 107, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the decoded image input from the addition unit 106 as a reference image under the control of the reference image control unit 207. The frame memory 206 includes a plurality of memory sets FM1 to FMN (here, N≥2) used for temporarily storing the reference image.

The prediction parameter control unit 204 prepares a plurality of combinations each of a reference image number and a prediction parameter as a table based on the motion information input from the decoding unit 801. Here, the motion information represents information of a motion vector representing the deviation of a motion that is used for the motion-compensated prediction, the reference image number, and a prediction mode such as a single-directional/bidirectional prediction. The prediction parameter represents information relating to the motion vector and the prediction mode. Then, the prediction parameter control unit 204 selects a combination of a reference number and a prediction parameter used for generating a predicted image based on the motion information and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be switched to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output terminal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203. In the decoding device 800, the reference image is not used by any unit other than the predicted image generating unit 805, and accordingly, the reference image may not be output to the outside of the predicted image generating unit 805.

The single-directional predicted motion compensation unit 203 performs a motion-compensated prediction process based on the prediction parameter input from the prediction parameter control unit 204 and the reference image input from the reference image selector 205, thereby generating a single-directional predicted image. The motion compensated prediction has already been described with reference to FIG. 5, and thus, description thereof will not be presented.

The single-directional predicted motion compensation unit 203 outputs a single-directional predicted image and temporarily stores the single-directional predicted image in the memory 202. Here, in a case where the motion information (prediction parameter) represents a bi-directional prediction, the multi-frame motion compensation unit 201 makes a weighted prediction using two types of single-directional predicted images. Accordingly, the single-directional predicted motion compensation unit 203 stores a single-directional predicted image corresponding to the first type in the single-directional predicted image in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional predicted motion compensation unit 203, and the WP parameter information input from the motion evaluating unit 109, thereby generating a predicted image. The multi-frame motion compensation unit 201 outputs the predicted image so as to be input to the addition unit 804.

Here, the multi-frame motion compensation unit 201 will be described in detail with reference to FIG. 6. Similarly to the predicted image generating unit 107, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the index setting unit 806 so as to input the WP application flag to the WP selectors 304 and 305 and input the weighting information to the weighted motion compensation unit 302.

Here, the WP parameter information includes information of the fixed point precision of the weighting factor, a first WP application flag, a first weighting factor, and a first offset corresponding to the first predicted image, and a second WP application flag, a second weighting factor, and a second offset corresponding to the second predicted image. The WP application flag is a parameter that can be set for each corresponding reference image and signal component and represents whether or not a weighted motion compensation prediction is made. The weighting information includes information of the fixed point precision of the weighting factor, the first weighting factor, the first offset, the second weighting factor, and the second offset. Here, the WP parameter information represents the same information as that of the first embodiment.

Described in detail, when the WP parameter information is input from the index setting unit 806, the WP parameter control unit 303 outputs the WP parameter information with being divided into the first WP application flag, the second WP application flag, and the weighting information, thereby inputting the first WP application flag to the WP selector 304, inputting the second WP application flag to the WP selector 305, and inputting the weighting information to the weighted motion compensation unit 302.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing based on the two single-directional predicted images (the first and second predicted images) input from the WP selectors 304 and 305, thereby generating a predicted image. More specifically, in a case where the first and second WP application flags are "0", the default motion compensation unit 301 performs average processing based on Numerical Expression (1).

In addition, in a case where the prediction mode represented by the motion information (prediction parameter) is the single-directional prediction, the default motion compensation unit 301 calculates a final predicted image using only the first predicted image based on Numerical Expression (4).

The weighted motion compensation unit 302 performs weighted motion compensation based on the two single-directional predicted images (the first and second predicted images) input from the WP selectors 304 and 305 and the weighting information input from the WP parameter control unit 303. More specifically, the weighted motion compensation unit 302 performs the weighting process based on Numerical Expression (7) in a case where the first and second WP application flags are "1".

In addition, in a case where the calculation precision of the first and second predicted images and the calculation precision of the predicted image are different from each other, the weighted motion compensation unit 302 realizes a rounding process by controlling $logWD_C$, which is fixed point precision, as in Numerical Expression (8).

In addition, in a case where the prediction mode represented by the motion information (prediction parameter) is a single directional prediction, the weighted motion compensation unit 302 calculates a final predicted image using only the first predicted image based on Numerical Expression (9).

In addition, in a case where the calculation precision of the first and second predicted images and the calculation precision of the predicted image are different from each other, the weighted motion compensation unit 302 realizes a rounding process by controlling $logWD_C$, which is fixed point precision, as in Numerical Expression (8), similarly to the case of the bi-directional prediction.

The fixed point precision of the weighing factor has already been described with reference to FIG. 7, and thus, description thereof will not be presented. In addition, in the case of a single directional prediction, various parameters (the second WP application flag, the second weighting factor, and the second offset information) corresponding to the second predicted image are not used and may be set to initial values determined in advance.

The decoding unit 801 uses syntax 500 represented in FIG. 18. The syntax 500 represents the structure of encoded data that is a decoding target of the decoding unit 801. The syntax 500 has already been described with reference to FIG. 18, and thus, description thereof will not be presented. In addition, the picture parameter set syntax 505 has been described with reference to FIG. 19 except that decoding is used instead of encoding, and thus, description thereof will not be presented. Furthermore, the slice header syntax 507 has already been described with reference to FIG. 20 except that decoding is used instead of encoding, and thus, description thereof will not be presented. In addition, the pred weight table syntax 508 has already been described with reference to FIG. 21 except that decoding is used instead of encoding, and thus, description thereof will not be presented.

As above, according to the fourth embodiment, when weighted motion compensation is performed using two indices having the same reference image in a bi-directional prediction slice in which a bi-directional prediction can be selected but having mutually-different reference image numbers, the encoding device 800 solves the problem of a decrease in the encoding efficiency due to decoding the index having the same value twice.

By rearranging two reference lists included in the bi-directional prediction slice and a reference number set for each list to a common list and a common reference number, a combination of reference numbers representing the same reference image is not included in the reference list, and accordingly, the encoding device 800 can reduce the code amount of a redundant index.

Modification of Fourth Embodiment

A modification of the fourth embodiment will be described. In the modification of the fourth embodiment, syntax elements used by the decoding unit 801 are different from those of the fourth embodiment. The sequence parameter set syntax 504 has already been described with reference to FIG. 22 except that decoding is performed instead of encoding, and thus, the description thereof will not be presented. In addition, the adaptation parameter set syntax 506 has already been described with reference to FIG. 23 except that decoding is performed instead of encoding, and thus, the description thereof will not be presented. Furthermore, the pred weight table syntax 508 has already been described with reference to FIG. 24 except that decoding is performed instead of encoding, and thus, the description thereof will not be presented.

As above, according to the modification of the fourth embodiment, by employing a structure in which the pred weight table syntax 508 is called from the adaptation parameter set syntax 506, the code amount of the WP parameter information at the time of dividing one frame into a plurality of slices can be markedly reduced.

For example, the adaptation parameter set syntax 506 having mutually-different three types of WP parameter information to be used is decoded previously, aps_id is used depending on the situations by the slice header syntax 507, necessary WP parameter information is called such that the code amount can be configured to be smaller than that of a configuration in which the WP parameter information is constantly decoded using the slice header syntax 507.

Fifth Embodiment

In a fifth embodiment, a decoding device that decodes encoded data encoded by the encoding device according to the second embodiment will be described. In the decoding device 1000 according to the fifth embodiment, the configuration of an index setting unit 1006 is different from the decoding device 800 according to the fourth embodiment. Hereinafter, differences from the fourth embodiment will be mainly described, the same name/reference numeral as those of the fourth embodiment will be assigned to each constituent element having the same function as that of the fourth embodiment, and the description thereof will not be presented.

Figure 40:
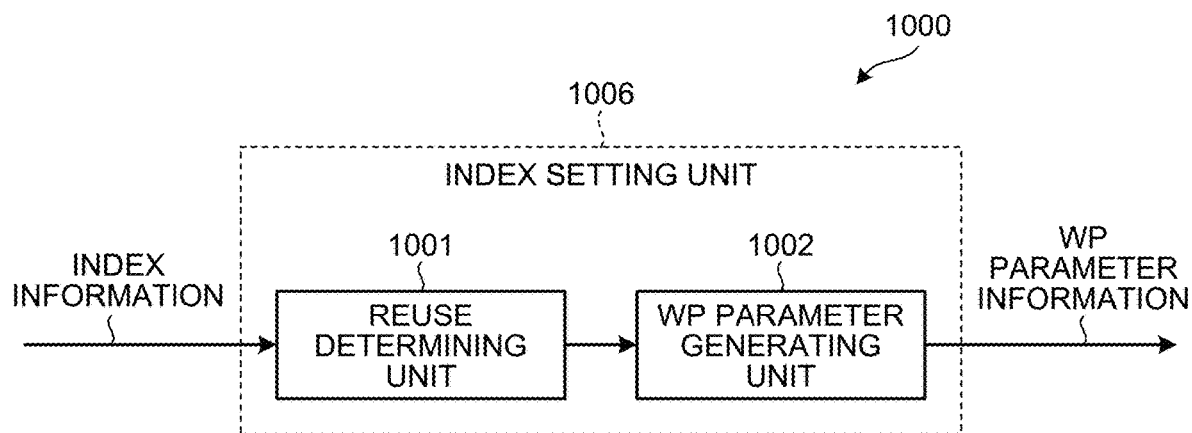
FIG. 40 is a block diagram that illustrates an example of the configuration of an index setting unit according to a fifth embodiment.

FIG. 40 is a block diagram that illustrates an example of the configuration of the index setting unit 1006 according to the fifth embodiment. The index setting unit 1006, as illustrated in FIG. 40, includes a reuse determining unit 1001 and a WP parameter generating unit 1002.

The reuse determining unit 1001 checks whether to reuse a WP parameter of List 0 by checking a reuse flag. In a case WP parameters of List 0 are reused, the WP parameter generating unit 1002 copies WP parameters of List 0 of a reference destination to WP parameters of List 1 based on the information that which WP parameter of List 0 is to be copied. Information relating to a reference number representing a reuse flag and a reference destination is described in a syntax element, and restores WP parameter information by allowing the WP parameter generating unit 1002 to analyze the index information.

The reuse determining unit 1001, for example, checks whether to use WP parameters of List 0 based on the pseudo code represented in Numerical Expression (11).

The pred weight table syntax 508 has already been described with reference to FIG. 27 except that decoding is performed instead of encoding, and thus, the description thereof will not be presented.

As above, according to the fifth embodiment, when weighted motion compensation is performed using two indices having the same reference image in a bi-directional prediction slice in which a bi-directional prediction can be selected but having mutually-different reference image numbers, the encoding device 1000 solves the problem of a decrease in the coding efficiency due to decoding an index having the same value twice.

The decoding device 1000 decodes the index of List 0 in a conventional manner, checks whether or not there is a combination of reference numbers representing the same reference image at the time of decoding the index of List 1, and, in the case of the same index, by reusing indices used in List 1 as indices used in List 0, the same indices are prevented from being decoded twice, and accordingly, the code amount of a redundant index can be reduced.

Sixth Embodiment

Figure 41:
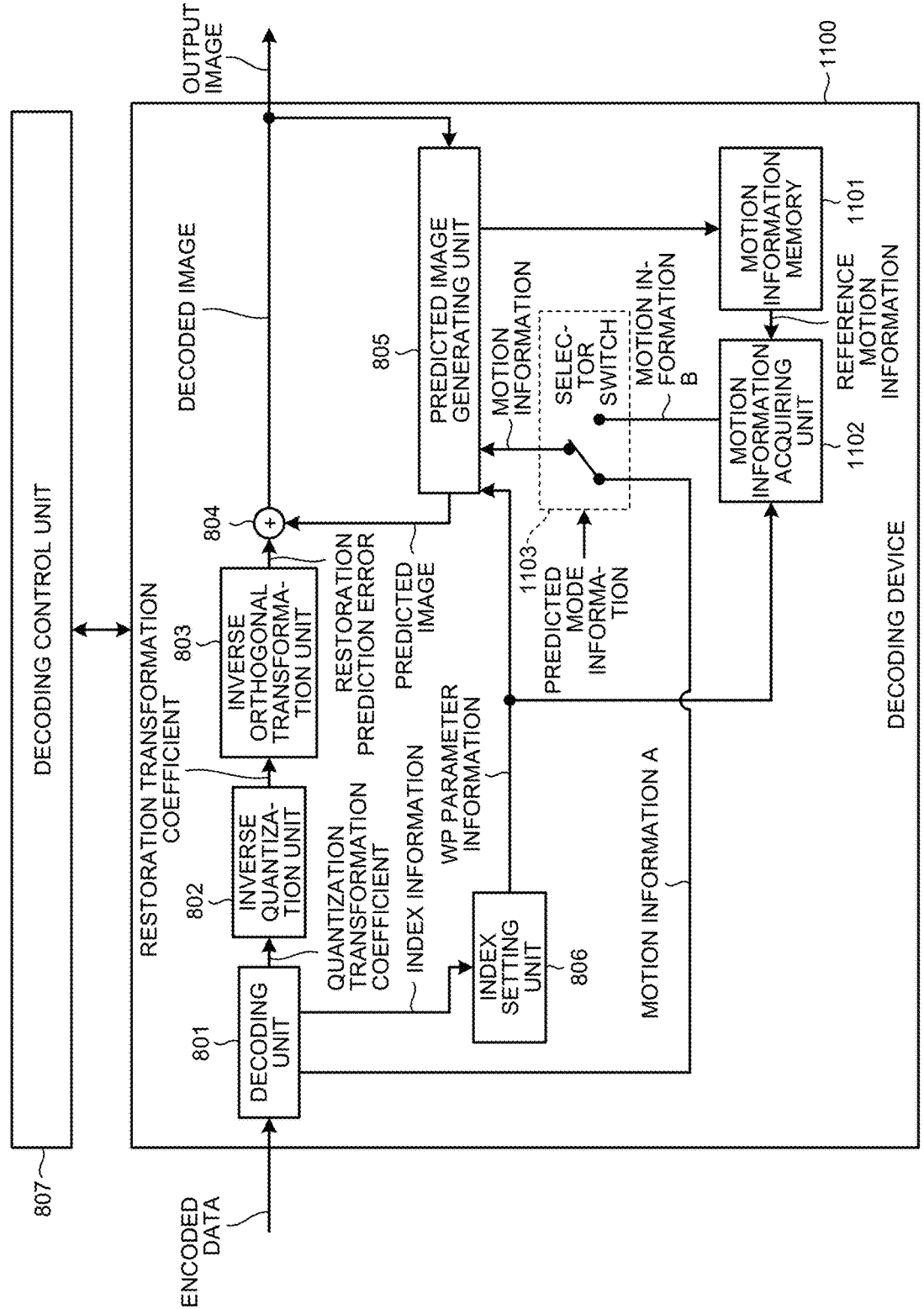
FIG. 41 is a block diagram that illustrates an example of the configuration of a decoding device according to a sixth embodiment.

In a six embodiment, a decoding device that decodes encoded data encoded by the encoding device according to the third embodiment will be described. FIG. 41 is a block diagram that illustrates an example of the configuration of the decoding device 1100 according to a sixth embodiment. The decoding device 1100 according to the sixth embodiment differs from the decoding device 800 according to the fourth embodiment in that the decoding device 1100 further includes a motion information memory 1101, a motion information acquiring unit 1102, and a selector switch 1103. Hereinafter, differences from the fourth embodiment will be mainly described, the same name/reference numeral as those of the fourth embodiment will be assigned to each constituent element having the same function as that of the fourth embodiment, and the description thereof will not be presented.

The motion information memory 1101 temporarily stores motion information applied to a pixel block that has been decoded as reference motion information. The motion information memory 1101 may reduce the information amount by performing a compression process such as sub-sampling for the motion information. The motion information memory 1101, as illustrated in FIG. 29, is maintained in units of frames or slices and further includes a spatial-directional reference motion information memory 701A that stores motion information on a same frame as reference motion information 710 and a time-directional reference motion information memory 701B that stores motion information of a frame that has been decoded as reference motion information 710. A plurality of time-directional reference motion information memories 701B may be arranged in accordance with the number of reference frames used by the decoding target frame for a prediction.

The reference motion information 710 is maintained in the spatial-directional reference motion information memory 701A and the time-directional reference motion information memory 701B in units of predetermined areas (for example, in units of 4×4 pixel blocks). The reference motion information 710 further includes information representing whether the area is encoded by an inter-prediction to be described later or is encoded by an intra-prediction to be described later. In addition, also in a case where a pixel block (a coding unit or a prediction unit) is inter-predicted using motion information predicted from a decoded area without the value of a motion vector included in the motion information being decoded as in a skip mode or a direct mode defined in H.264 or a merge mode to be described later, the motion information of the pixel block is maintained as the reference motion information 710.

When the decoding process for the decoding target frame or the encoding target slice is completed, the spatial-directional reference motion information memory 701A of the frame is changed to be treated as the time-directional reference motion information memory 701B used for a frame to be decoded next. At this time, in order to reduce the capacity of the time-directional reference motion information memory 701B, it may be configured such that the motion information is compressed, and the compressed motion information is stored in the time-directional reference motion information memory 701B.

The motion information acquiring unit 1102 receives reference motion information from the motion information memory 1101 as input and outputs motion information B used for a decoding pixel block. Since the operation of the motion information acquiring unit 1102 is the same as that of the motion information acquiring unit 702 according to the third embodiment, the description thereof will not be presented.

The selector switch 1103 selects one of motion information B output from the motion information acquiring unit 1102 and motion information A output from the decoding unit 801 in accordance with prediction mode information to be described later and outputs the selected motion information to the predicted image generating unit 805 as motion information. The motion information A output from the decoding unit 801 is used for decoding information of a difference from a predicted motion vector acquired from a predicted motion vector acquiring unit not illustrated in the figure and predicted motion vector acquiring position information. Hereinafter, such a prediction mode will be referred to as an inter-mode. On the other hand, the motion information B output from the motion information acquiring unit 1102 in accordance with prediction mode information is used for merging motion information from adjacent pixel blocks and is directly applied to a decoding pixel block, and accordingly, information (for example, motion vector difference information) relating to the other motion information does not need to be decoded. Hereinafter, such a prediction mode will be referred to as a merge mode.

The prediction mode information is in accordance with a prediction mode that is controlled by the decoding control unit 807 and includes switching information of the selector switch 1103.

The pred unit syntax 512 has already been described with reference to FIG. 36 except that decoding is performed instead of encoding, and thus, the description thereof will not be presented.

The advantages of the sixth embodiment are the same as those of the third embodiment, and thus, the description thereof will not be presented.

In addition, as another example of the storage process for MergeCandList, it may be configured such that it is determined whether or not the WP parameter of the reference frame of a block T that is adjacent in time and the WP parameter of the reference frame of the decoding pixel block match each other when the motion information of the block T that is adjacent in time is stored in MergeCandList, and the motion information is stored in MergeCandList only in a case where the WP parameters match each other. The reason for this is that, in a case where the WP parameter of the reference frame of the block T that is adjacent in time and the WP parameter of the reference frame of the decoding pixel block are different from each other, it can be estimated that the correlation between the motion information of the block T that is adjacent in time and the motion information of the decoding pixel block is lowered.

In addition, as a further another example, in a case where WP parameter of the reference frame of the block T that is adjacent in time and the WP parameter of the reference frame of the decoding pixel block are different from each other, a block having the same WP parameter in the reference frame of the decoding pixel block out of blocks adjacent to the block T in space may be replaced with the block T. At this time, the correlation between the motion information of the block T that is adjacent in time and the motion information of the decoding pixel block is not lowered.

Modification

The first to third embodiments may be selectively used. In other words, it may be configured such that information for selecting a method is set in advance, and, in a case where a bi-directional slice is selected, the technique to be used may be changed based on the information representing whether the technique of the first embodiment is used or the technique of the second embodiment is used. For example, by setting a flag used for changing such a technique in the slice header syntax illustrated in FIG. 20, the technique to be used can be easily selected depending on the encoding situations. In addition, a technique to be used may be set in advance in accordance with the configuration of specific hardware. The predicted image generating units and the index setting units according to the first to third embodiments may be appropriately mounted either by hardware or by software.

The fourth to sixth embodiments may be selectively used. In other words, it may be configured such that information for selecting a method is set in advance, and, in a case where a bi-directional slice is selected, the technique to be used may be changed based on the information representing whether the technique of the fourth embodiment is used or the technique of the fifth embodiment is used. For example, by setting a flag used for changing such a technique in the slice header syntax illustrated in FIG. 20, the technique to be used can be easily selected depending on the encoding situations. In addition, a technique to be used may be set in advance in accordance with the configuration of specific hardware. The predicted image generating units and the index setting units according to the fourth to sixth embodiments may be appropriately mounted either by hardware or by software.

In addition, between rows of the syntax tables illustrated in the first to sixth embodiments as examples, a syntax element not defined in the embodiment may be inserted, or a description relating to the other conditional branch may be included. Furthermore, the syntax table may be divided into a plurality of tables, or a plurality of the syntax tables may be integrated. In addition, the term of each syntax element represented as an example may be arbitrarily changed.

The modification of the first embodiment may be easily applied to the second embodiment. In such a case, a maximum number of reference images corresponding to Lists 0 and 1 may be set, and the maximum number may be set in advance.

The modification of the fourth embodiment may be easily applied to the fifth embodiment. In such a case, a maximum number of reference images corresponding to Lists 0 and 1 may be set, and the maximum number may be set in advance.

In the first to sixth embodiments described above, an example has been described in which the frame is divided into rectangular blocks each having a pixel size of 16×16 or the like and is encoded/decoded in order from an upper left block of the screen toward the lower right block (see FIG. 3A). However, the encoding order and the decoding order are not limited to those illustrated in this example. For example, the encoding and the decoding may be performed in order from the lower right side toward the upper left side, or the encoding and the decoding may be performed so as to draw a whirlpool from the center of the screen toward the end of the screen. In addition, the encoding and the decoding may be performed in order from the upper right side toward the lower left side, or the encoding and the decoding may be performed so as to draw a whirlpool from the end of the screen toward the center of the screen. In such a case, since the position of an adjacent pixel block that can be referred to in accordance with the encoding order changes, the position may be changed to an appropriately usable position.

In the first to sixth embodiments described above, while the description has been presented with the size of a prediction target block such as a 4×4 pixel block, a 8×8 pixel block, a 16×16 pixel block or the like being illustrated as an example, the prediction target block may not have a uniform block shape. For example, the size of the prediction target bock may be a 16×8 pixel block, a 8×16 pixel block, a 8×4 pixel block, a 4×8 pixel block, or the like. In addition, it is not necessary to uniformize all the block sizes within one coding tree block, and a plurality of block sizes different from each other may be mixed. In a case where a plurality of block sizes different from each other are mixed within one coding tree block, the code amount for encoding or decoding division information increases in accordance with an increase in the number of divisions. Thus, it is preferable to select a block size in consideration of the balance between the code amount of the division information and the quality of a local encoded image or a decoded image.

In the first to sixth embodiments described above, for the simplification, a comprehensive description has been presented for a color signal component without the prediction processes of the luminance signal and the color difference signal not being differentiated from each other. However, in a case where the prediction processes of the luminance signal and the color difference signal are different from each other, the same prediction method or prediction methods different from each other may be used. In a case where prediction methods different from each other are used for the luminance signal and the color difference signal, encoding or decoding may be performed using the prediction method selected for the color difference signal similarly to that for the luminance signal.

In the first to sixth embodiments described above, for the simplification, a comprehensive description has been presented for a color signal component without the weighted motion compensated prediction processes of the luminance signal and the color difference signal not being differentiated from each other. However, in a case where the weighted prediction processes of the luminance signal and the color difference signal are different from each other, the same weighted prediction method or weighted prediction methods different from each other may be used. In a case where weighted prediction methods different from each other are used for the luminance signal and the color difference signal, encoding or decoding may be performed using the weighted prediction method selected for the color difference signal similarly to that for the luminance signal.

In the first to sixth embodiments described above, between the rows of the table represented in the syntax configuration, a syntax element not defined in this embodiment may be inserted, and a technique relating to other conditional branches may be included. Alternatively, a syntax table may be divided into a plurality of tables, or syntax tables may be integrated together. In addition, the same term may not be necessarily used, but the term may be arbitrarily changed in accordance with a used form.

As described above, according to each embodiment, the problem of encoding redundant information at the time of performing a weighted motion compensation prediction is solved, and the weighted motion compensated prediction process having high efficiency is realized. Therefore, according to each embodiment, the coding efficiency is improved, and subjective image quality is improved.

Figure 42:
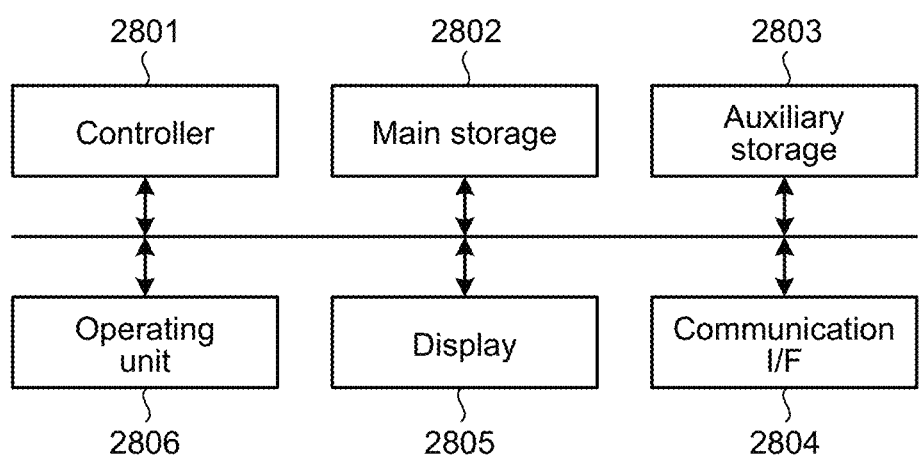
FIG. 42 is a view illustrating a hardware configuration of the device according to each embodiment.

Next, a hardware configuration of the device (the encoding device, and the decoding device) according to each embodiment will be described with reference to FIG. 42. FIG. 42 is an explanatory view illustrating a hardware configuration of the device according to each embodiment. The encoding device and the decoding device each comprise a control unit 2801, such as a CPU (Central Processing Unit) which controls the overall device, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the encoding device and the decoding device are connected wirelessly or through a wire to a communication I/F (Interface) 2804 which controls communication with an external apparatus, a display 2805 which displays information, and an operating unit 2806, such as a keyboard or a mouse which receives instructions input by the user. Data to be encoded and data to be decoded may be stored in the HDD, or input by the disk drive apparatus, or input externally via the communication I/F 2804.

The hardware configuration shown in FIG. 42 is a mere example. The encoding device and the decoding device of each embodiment may be implemented partly or entirely by an integrated circuit such as an LSI (Large Scale Integration) circuit or an IC (Integrated Circuit) chip set. The functional blocks of the encoding device and the decoding device may be individually formed of a processor, or may be integrated partly or entirely as a processor. Integration of the circuits of the configuration is not limited to LSI, but may be implemented as a dedicated circuit or a general-purpose processor.

While several embodiments of the present invention have been described, such embodiments are presented as examples and are not for the purpose of limiting the scope of the invention. These novel embodiments can be performed in other various forms, and various omissions, substitutions, and changes can be made therein in a range not departing from the concept of the invention. These embodiments and modifications thereof belong to the scope or the concept of the invention and belong to the invention described in the claims and a scope equivalent thereto.

For example, a program realizing the process of each embodiment described above may be provided with being stored in a computer-readable storage medium. As the storage medium, a storage medium that can store a program and can be read by a computer such as a magnetic disk, an optical disc (a CD-ROM, a CD-R, a DVD, or the like), an magneto-optical disk (an MO or the like), or a semiconductor memory may be used regardless of the storage form.

In addition, the program realizing the process of each embodiment may be stored in a computer (server) connected to a network such as the Internet and be downloaded to a computer (client) through the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoding method comprising:
  generating encoded data, the encoded data including:
    a first syntax describing a first syntax element including a number of reference images in a first reference image list and a second syntax element including a number of reference images in a second reference image list,
    a second syntax describing a plurality of parameters that are obtained by using a common index commonly used for the first reference image list and the second reference image list, and
    a third syntax describing a third syntax element including a maximum number of values taken by the common index, wherein
  the common index is used to obtain the reference image from the first reference image list and the second reference image list.

2. An encoding device comprising:
  circuitry configured to generate encoded data, the encoded data including:
    a first syntax describing a first syntax element including a number of reference images in a first reference image list and a second syntax element including a number of reference images in a second reference image list,
    a second syntax describing a plurality of parameters that are obtained by using a common index commonly used for the first reference image list and the second reference image list, and
    a third syntax describing a third syntax element including a maximum number of values taken by the common index, wherein
  the common index is used to obtain the reference image from the first reference image list and the second reference image list.

* * * * *